(12) United States Patent
Bertolotti et al.

(10) Patent No.: US 12,214,305 B2
(45) Date of Patent: Feb. 4, 2025

(54) DEVICE AND METHOD FOR FILTERING A FLUID CIRCULATING IN A PLUMBING AND HEATING SYSTEM

(71) Applicant: I.V.A.R. S.P.A., Prevalle (IT)

(72) Inventors: Umberto Bertolotti, Prevalle (IT); Mario Contini, Flero (IT)

(73) Assignee: I.V.A.R. S.P.A., Prevalle (IT)

( * ) Notice: Subject to any disclaimer, the term of this patent is extended or adjusted under 35 U.S.C. 154(b) by 563 days.

(21) Appl. No.: 17/273,365

(22) PCT Filed: Aug. 29, 2019

(86) PCT No.: PCT/IB2019/057292
§ 371 (c)(1),
(2) Date: Mar. 4, 2021

(87) PCT Pub. No.: WO2020/053691
PCT Pub. Date: Mar. 19, 2020

(65) Prior Publication Data
US 2021/0346826 A1    Nov. 11, 2021

(30) Foreign Application Priority Data
Sep. 10, 2018 (IT) .......................... 102018000008461

(51) Int. Cl.
*B01D 35/06* (2006.01)
*B01D 35/30* (2006.01)
(Continued)

(52) U.S. Cl.
CPC ............. *B01D 35/06* (2013.01); *B01D 35/30* (2013.01); *B03C 1/0332* (2013.01); *B03C 1/28* (2013.01);
(Continued)

(58) Field of Classification Search
CPC ........ B01D 35/06; B01D 35/30; B01D 29/15; B03C 1/0332; B03C 1/28; B03C 1/30;
(Continued)

(56) References Cited

U.S. PATENT DOCUMENTS 2,437,221 A * 3/1948 Cox ........................ B03C 1/28
                                                     210/223
3,363,764 A * 1/1968 Whitaker ............... B01D 21/02
                                                     210/138
(Continued)

FOREIGN PATENT DOCUMENTS

EP    3159313 A1    4/2017
EP    3257820 A1    12/2017

OTHER PUBLICATIONS

Search Report dated Oct. 30, 2019 in corresponding International Application No. PCT/IB2019/057292, 3 pages.
(Continued)

*Primary Examiner* — Liam Royce
(74) *Attorney, Agent, or Firm* — MH2 TECHNOLOGY LAW GROUP LLP

(57) ABSTRACT

The present invention relates to a device (1) for filtering a fluid circulating in a plumbing and heating system, comprising a body (2) defining therewithin a filtration chamber (3) that is destined to have a fluid to be subjected to filtration pass through it. The body is provided with a first inlet/outlet opening (10), a second inlet/outlet opening (20) and a third inlet/outlet opening (30): each of which sets the filtration chamber (3) in communication with the outside of the device and can be associated with a line of the system to receive therefrom, or send thereto a fluid entering or exiting said body of the device. The device operates a passage of fluid through the filtration chamber (3), in a selective manner according to a plurality of operative configurations, from an opening between said first (10), second (20) and third (Continued)

inlet/outlet opening (30) to a further opening between said first, second and third inlet/outlet opening. The device further comprises filtering members (40) housed inside the filtration chamber and interposed between the inlet/outlet openings to perform filtering of the fluid passing through the filtration chamber; the filtering members comprise a mechanical filter (41) arranged in the filtration chamber and structured so as to divide the filtration chamber into a first sub-chamber (A), a second sub-chamber (B) and a third sub-chamber (C), in which the first sub-chamber is in fluid communication, without passing through the mechanical filter, with the first inlet/outlet opening, the second sub-chamber is in fluid communication, without passing through the mechanical filter, with the second inlet/outlet opening, and the third sub-chamber is in fluid communication, without passing through the mechanical filter, with the third inlet/outlet opening.

17 Claims, 18 Drawing Sheets

(51) Int. Cl.
*B03C 1/033* (2006.01)
*B03C 1/28* (2006.01)
*B03C 1/30* (2006.01)
*F24D 19/00* (2006.01)

(52) U.S. Cl.
CPC ............ *B03C 1/30* (2013.01); *F24D 19/0092* (2013.01); *B03C 2201/18* (2013.01)

(58) Field of Classification Search
CPC . B03C 1/286; B03C 2201/18; B03C 2201/28; F24D 19/0092; C02F 1/482; C02F 1/004; C02F 2103/02; C02F 2303/14; C02F 2303/22; C02F 2303/24
See application file for complete search history.

(56) References Cited

U.S. PATENT DOCUMENTS 3,764,525 A * 10/1973 Goodman ............. C02F 3/1242
210/615
2011/0073550 A1   3/2011 Cartarius
2013/0192286 A1   8/2013 Wang et al.
2017/0333816 A1* 11/2017 Olschok ................ B01D 29/35

OTHER PUBLICATIONS

Written Opinion dated Oct. 30, 2019 in corresponding International Application No. PCT/IB2019/057292, 6 pages.

* cited by examiner

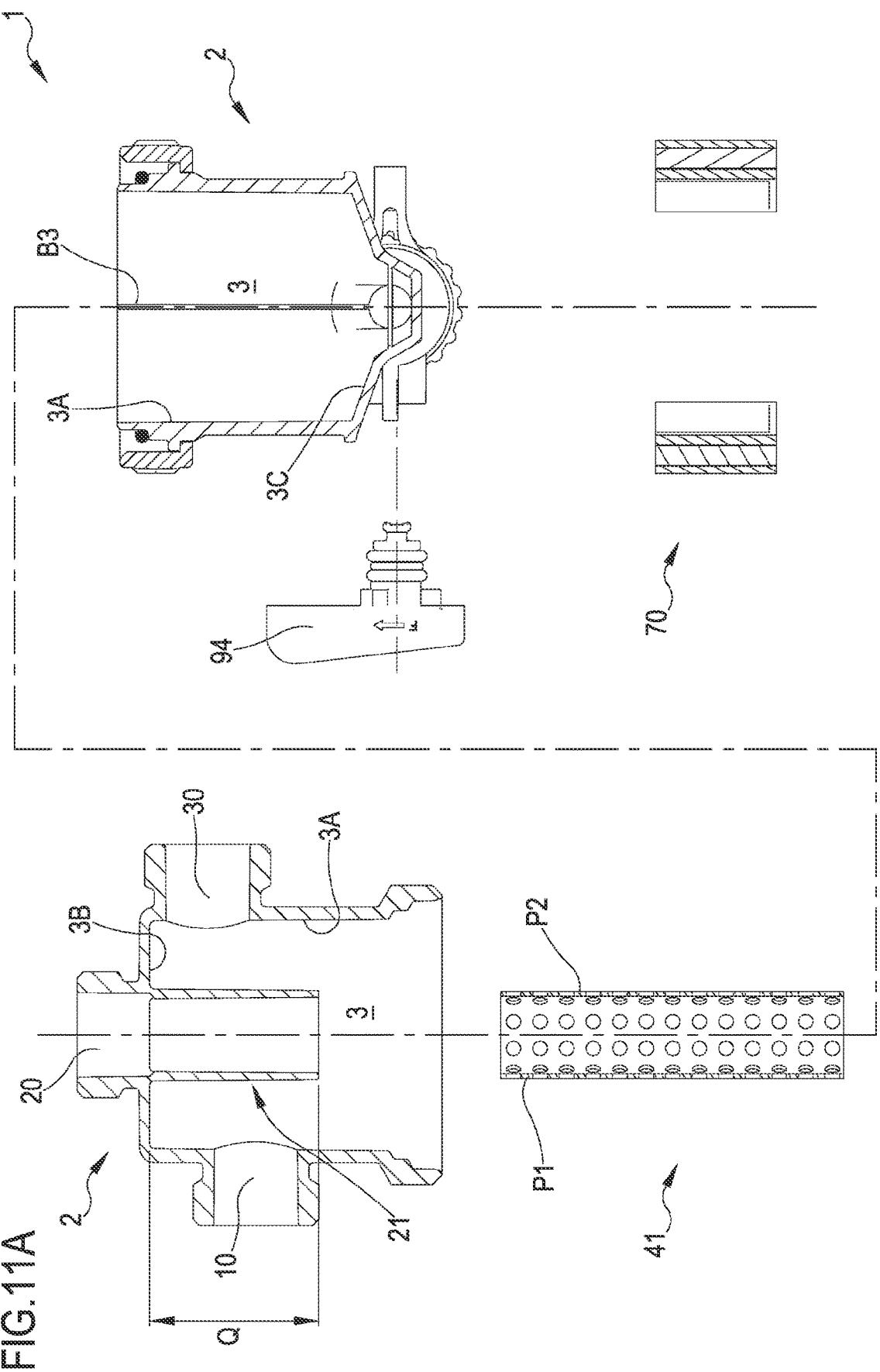

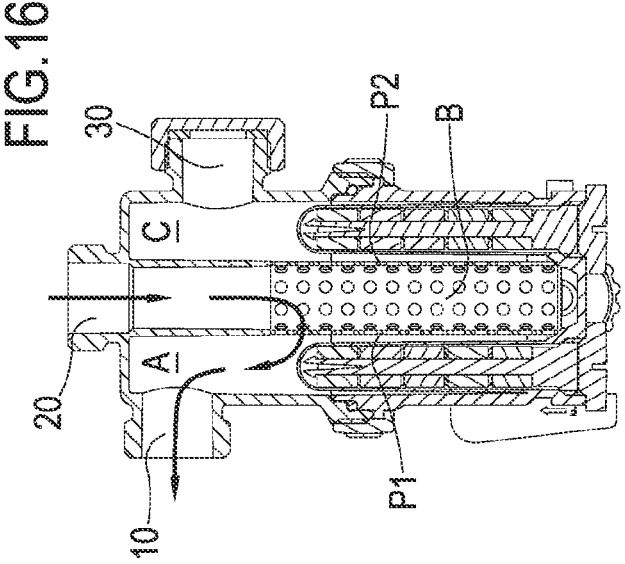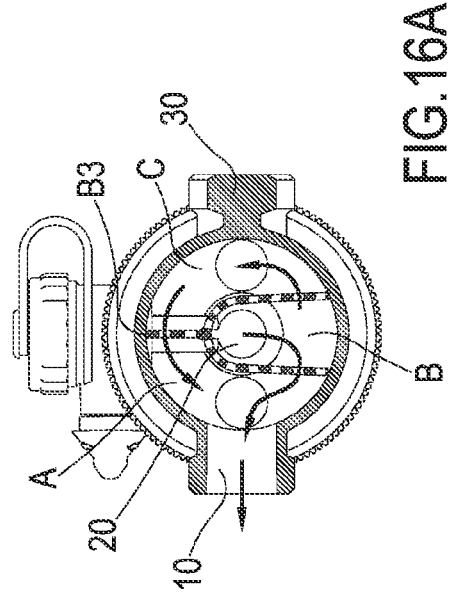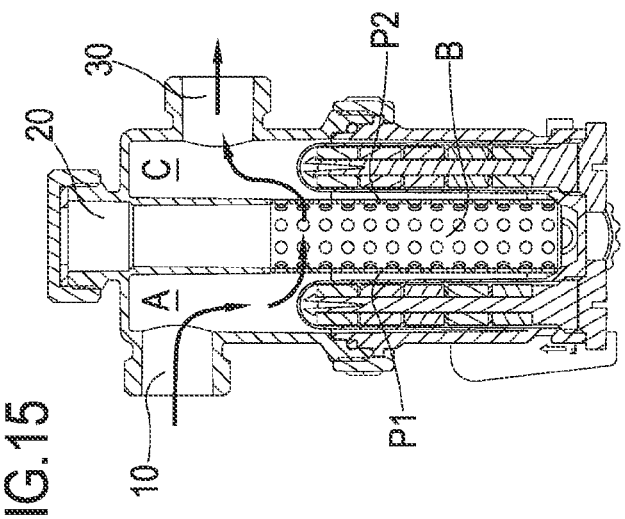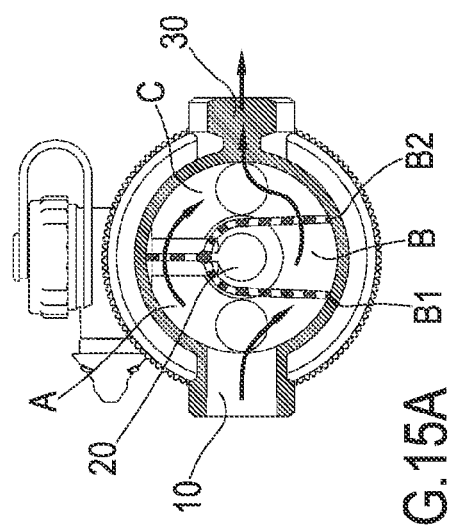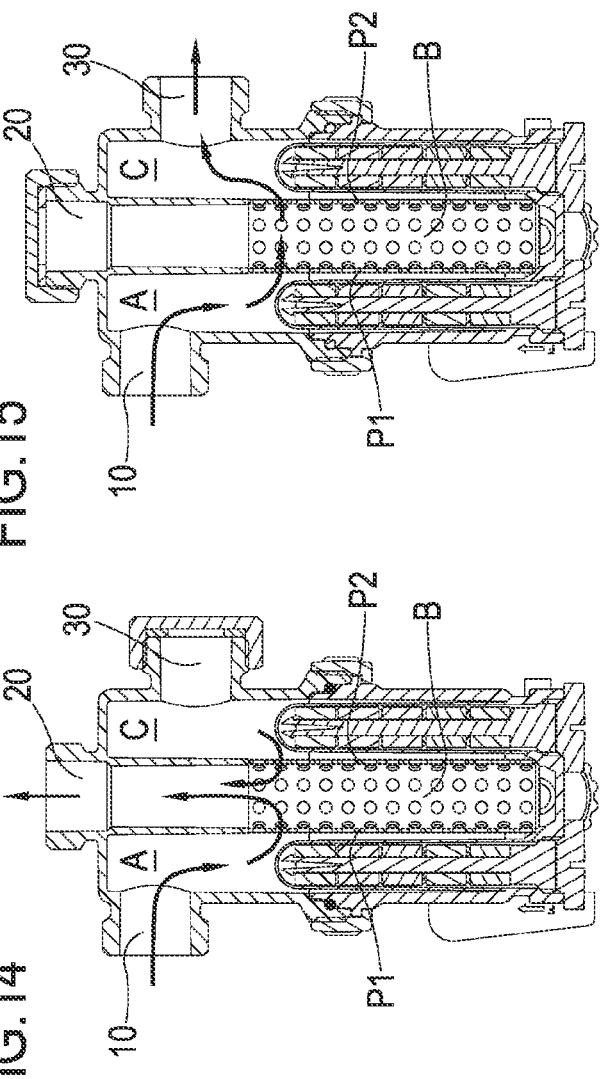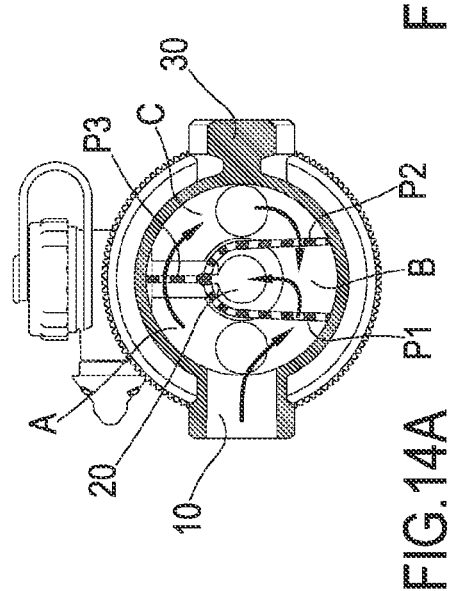

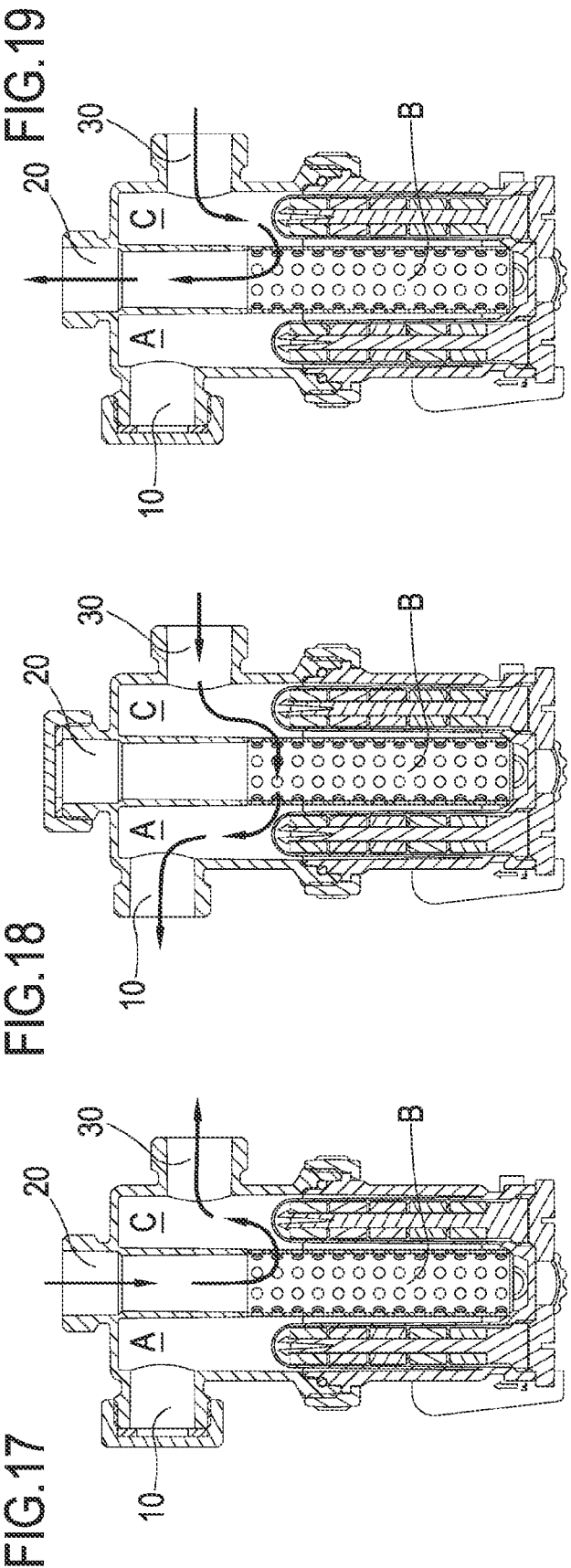

DEVICE AND METHOD FOR FILTERING A FLUID CIRCULATING IN A PLUMBING AND HEATING SYSTEM

CROSS-REFERENCE TO RELATED APPLICATIONS

This application is a U.S. National Stage application of PCT/IB2019/057292 filed Aug. 29, 2019, pending, which claims priority to Italian Patent Application No. 102018000008461 filed Sep. 10, 2018, the entire disclosures of which are hereby incorporated by reference in their entireties.

The present invention relates to a device and a method thereof, for filtering a fluid circulating in a plumbing and heating system.

The invention is advantageously applied in the context of plumbing systems for temperature regulation and/or for supplying domestic hot water in buildings of residential, commercial or industrial type.

Heating systems or systems for supplying domestic hot water provide for the circulation of a fluid, typically water, that circulates through the various components of the system (pipes, boiler, pump, valves, radiating elements, utilities, etc.).

In such systems, the use is known of filters for maintaining the circulating fluid as clean as possible, i.e. free of impurities, such as dirt, sand, polluting particles, etc. This is because these impurities circulating inside the system can cause blockages, faults in certain components, in particular the boiler and the valves and generally diminish performance of the various components and a loss of total efficiency.

Of the various impurities, it is particularly important to remove ferrous particles—typically released by components of the system such as pipes and radiating elements (for example heaters and radiators)—as they may cause breakages inside the members of the boiler or pierce the system lines.

Usually, the filters are installed interposed between the line carrying the fluid returning from the system, which is typically full of impurities and ferrous particles, and the line that sends the fluid entering the boiler (or heat pump). In this manner, the filter can act on the delivery to the boiler, i.e. upstream of the latter, sending fluid that is filtered and purified of impurities.

Through this typical installation, known filters are usually identified as "under-boiler" filters; further, in the jargon of the technical sector, these filters are known as "dirt separator" because of their function of removing impurities.

Providing for the filter being able to be opened to perform periodic maintenance tasks and in particular to remove impurities collected by the filter or replace the filtering elements is also known.

One type of filter of known type provides for both the use of mesh filtering elements that retain impurities such as sand and dirt and the use of filtering elements of magnetic type that enable the ferrous particles to be separated from the fluid in transit by attracting the particles and retaining the particles in contact with the magnetic element.

One example of a mechanical and magnetic filter is disclosed in European patent application EP3159313A1. This solution provides a filter body provided with three distinct inlet/outlet mouthpieces, which are identical to one another, two of which are lateral, in opposite positions of the body, and an upper mouthpieces; the three s are substantially arranged in a "T". During the installation step, it is possible to select which of the three mouthpieces has to be connected to the return line of the system and which on the other hand has to be connected to the boiler delivery. This enables the filter to be positioned and mounted vertically and horizontally on the basis of the space available under the boiler (which is very reduced in certain cases) and on the basis of the position of the wall to which the boiler is fixed, connecting the mouthpieces appropriately.

The Applicant has found that the known solutions described above are not free of drawbacks and various aspects thereof are improvable.

First of all, certain known solutions provided with three mouthpieces arranged in a "T" are able to filter effectively only when the central mouthpiece, i.e. the mouthpiece placed above the body of the filter, is used for the entry of the fluid into the filter or for the exit of the fluid from the filter. This is because such solutions provide a mesh filtering element (mechanical filtering) of cylindrical shape arranged longitudinally inside the filtration chamber itself, over the entire length of the chamber, and a magnetic filtering element arranged, in turn, inside the mesh cylindrical element. In this configuration, the central mouthpiece (placed above the body of the cylinder) is inside the mesh cylindrical element, whereas the two side mouthpieces (on opposite sides of the body of the cylinder) are on the other hand outside the mesh cylindrical element.

This means that, in particular in the configurations in which the two side mouthpieces are used for the entry of the fluid to be filtered and for the exit of the filtered fluid (and the upper mouthpiece is plugged), the flow can easily pass through the filtration chamber by passing around the mesh cylindrical element, without being forced to pass through the mesh cylindrical element, and this causes most of the fluid to pass through the filter without being subjected to mechanical filtering (i.e. without passing through the meshes), with consequent reduced filtering of impurities and dirt, and without transiting near the magnetic element, with consequent reduced filtering of the ferrous particles.

Substantially, although some of the known solutions are proposed for use according to various configurations and are destined to meet the different installation needs, they operate efficiently only in one configuration whereas in other configurations there is no passage of the entire flow through the filtering elements but a simple transit from the inlet mouthpiece to the outlet mouthpiece.

In addition, the known solutions have a risk of clogging of the mesh cylindrical element that operates the mechanical filtering, by non-optimum use of the flows circulating inside the filtration chamber. Clogging introduces flow rate loss through the filter, or also a complete blockage.

Further, known filters are unable to provide effective solutions in terms of assembly, access and maintenance for all the different installation conditions and the different types of boiler, heat exchanger or heat pump.

In this situation, the object that is the basis of the present invention in its various aspects and/or embodiments is to provide a device and a method for filtering a fluid that can be able to remedy one or more of the aforesaid drawbacks.

A further object of the present invention is to provide a device and a method that are able to perform effective filtration of a fluid circulating in a plumbing and heating system.

A further object of the present invention is to provide a device for filtering a fluid that is characterized by great versatility and is able to adapt to a great number and different types of boiler or other components of a heating system.

A further object of the present invention is to provide a device for filtering a fluid that is able to operate with uniform high performance regardless of the mode of installation inside a plumbing and heating system.

A further object of the present invention is to provide a device for filtering a fluid characterized by great operating reliability and/or by less predisposition to faults and malfunctions and/or is able to be maintained simply and rapidly.

A further object of the present invention is to provide a device for filtering a fluid characterized by a simple and rational structure.

A further object of the present invention is to provide a device for filtering a fluid characterized by modest production costs with respect to the performance and quality offered.

A further object of the present invention is to create alternative solutions to the prior art, in making devices and methods for filtering a fluid circulating in a plumbing and heating system, and/or opening new design fields.

These aims and other possible aims that will become more apparent during the following description are substantially achieved by a device for filtering a fluid and a method for filtering a fluid in accordance with one or more of the accompanying claims, each of which taken alone (without the corresponding appended clauses) or in any combination with the other claims, and according to the following aspects and/or embodiments, variously combined, also with the aforesaid claims.

In a first aspect, the invention relates to a device for filtering a fluid, comprising a body of the device defining therewithin a filtration chamber that is destined to have a fluid to be subjected to filtration pass through it, said body being provided with:

a first inlet/outlet opening, which sets said filtration chamber in communication with the outside of the device and is configured to be associated with a line so as to receive therefrom, or send thereto a fluid entering or exiting said body of the device;

a second inlet/outlet opening, which sets said filtration chamber in communication with the outside of the device and is configured to be associated with a line so as to receive therefrom, or send thereto a fluid entering or exiting said body of the device;

a third inlet/outlet opening, which sets said filtration chamber in communication with the outside of the device and is configured to be associated with a line so as to receive therefrom, or send thereto a fluid entering or exiting said body of the device.

In one aspect, the device is configured to operate a passage of fluid through said filtration chamber, in a selective manner according to a plurality of operative configurations, from an opening between said first inlet/outlet opening, second inlet/outlet opening and third inlet/outlet opening to a further opening between said first inlet/outlet opening, second inlet/outlet opening and third inlet/outlet opening.

In one aspect, the device comprises filtering members, housed at least partially inside said filtration chamber, or associated with said body of the device, and operatively interposed between said first inlet/outlet opening, second inlet/outlet opening and third inlet/outlet opening to perform filtering of the fluid passing through the filtration chamber.

In one aspect, the filtering members comprise at least one mechanical filter configured to operate a mechanical separation of solid substances and particles present in the fluid to be treated from the fluid itself in which the solid particles are suspended, said mechanical filter being arranged inside said filtration chamber and structured so as to divide, preferably longitudinally, the filtration chamber into a first sub-chamber, a second sub-chamber and a third sub-chamber.

In one aspect, the first sub-chamber is in fluid communication, without passing through the mechanical filter, (only) with the first inlet/outlet opening (and not with the second and/or the third inlet/outlet opening).

In one aspect, the second sub-chamber is in fluid communication, without passing through the mechanical filter, (only) with the second inlet/outlet opening (and not with the first and/or the third inlet/outlet opening).

In one aspect, the third sub-chamber is in fluid communication, without passing through the mechanical filter, (only) with the third inlet/outlet opening (and not with the first and/or the second inlet/outlet opening).

In one aspect, the device is so configured that the fluid transiting in the filtration chamber, in each of said pluralities of operative configurations, passes through (necessarily) at least partially said mechanical filter to pass between said first sub-chamber, second sub-chamber and third sub-chamber.

In one aspect, the device is configured to be associated with or mounted along a delivery line, or serially in a delivery line, conveying a fluid to an apparatus of a plumbing and heating system, to operate filtration of this fluid, circulating in the system, in a position upstream of this equipment.

In one aspect, the passage between the first sub-chamber and the second sub-chamber, between the second sub-chamber and the third sub-chamber and between the first sub-chamber and the third sub-chamber necessarily occurs through the mechanical filter.

In one aspect, the first sub-chamber, the second sub-chamber and the third sub-chamber communicate with one another through the mechanical filter.

In one aspect, the mechanical filter has at least partially a structure provided with a plurality of passages having a given filtering section, such that the passage of the fluid through the mechanical filter determines the retention, on one side of the mechanical filter from which the fluid passing through the mechanical filter is coming, of the substances and particles present in the fluid and having larger dimensions than said filtering section.

In one aspect, the mechanical filter has the form of a thin layer or membrane, with a given shape and has a longitudinal extension between an upper end and a lower end.

In one aspect, the mechanical filter has a given cross section, which is orthogonal to the longitudinal extension thereof, which is preferably substantially constant.

In one aspect, the joining of the first sub-chamber, of the second sub-chamber and of the third sub-chamber overall defines the entire filtration chamber.

In one aspect, the mechanical filter has a substantially Y shape configured to divide the filtration chamber into said first sub-chamber, second sub-chamber and third sub-chamber.

In one aspect, the mechanical filter comprises:
a first wall interposed between and separating, the first inlet/outlet opening and the second inlet/outlet opening;
a second wall interposed between and separating the second inlet/outlet opening and the third inlet/outlet opening;
a third wall interposed between and separating the first inlet/outlet opening and third inlet/outlet opening.

In one aspect, the first sub-chamber is defined between the first wall and the third wall, the second sub-chamber is defined between the first wall and the second wall and the third sub-chamber is defined between the second wall and the third wall.

In one aspect, each of said first wall, second wall and third wall has, at least in one respective portion, a structure provided with said plurality of passages having a given filtering section, such that the passage of the fluid through the wall determines the retention, on one side of the wall from which the fluid passing through the mechanical filter is coming, of the substances and particles present in the fluid and having larger dimensions than said filtering section.

In one aspect, said first wall, second wall and third wall is each configured to filter mechanically a flow of fluid with both sides thereof, according to the direction from which the fluid to be filtered is coming.

In one aspect, said first wall, said second wall and said third wall overall constitute the entire mechanical filter.

In one aspect, said first wall, said second wall and said third wall are joined to one another so as to form said mechanical filter, in a single piece.

In one aspect, said mechanical filter is monobloc.

In one aspect, said first wall, said second wall and said third wall extend vertically inside the filtration chamber.

In one aspect, said first wall, said second wall and said third wall each have the form of a flat or curved thin layer.

In one aspect, each of said first wall, second wall and third wall constitutes a filtering septum.

In one aspect, the mechanical filter has said Y shape in a cross section, which is preferably orthogonal to said longitudinal extension of the mechanical filter itself.

In one aspect, said first wall, said second wall and said third wall are joined, in the mechanical filter, at a junction line, which is preferably vertical, which is common to the third walls.

In one aspect, said junction line corresponds, in section, to the centre of said Y shape of the section of the mechanical filter.

In one aspect, at said junction line, the three sub-chambers of the filtration chamber converge without entering into fluid communication except through the mechanical filter.

In one aspect, the first sub-chamber, the second sub-chamber and the third sub-chamber have a section, which is orthogonal to said substantially constant longitudinal extension of the mechanical filter.

In one aspect, said mechanical filter is configured to operate in a single use position, maintained for each of said pluralities of operative configurations adopted by the device, in which:

prevents a direct passage of the fluid, without passing through of at least one portion of the mechanical filter itself, from the first opening to the second opening or from the first opening to the third opening;

prevents a direct passage of the fluid, without passing through of at least one portion of the mechanical filter itself, from the second opening to the first opening or from the third opening to the first opening;

prevents a direct passage of the fluid, without passing through of at least one portion of the mechanical filter itself, from the third opening to the first opening or from the third opening to the second opening.

In one aspect, the mechanical filter does not need to be moved when the operative configuration adopted by the device varies.

In one aspect, said mechanical filter is configured to operate in a single use position, maintained for each of said pluralities of operative configurations adopted by the device, in which:

a passage of the fluid from the first opening to the second opening or from the first opening to the third opening takes place by passage through at least one portion of the mechanical filter itself;

a passage of the fluid from the second opening to first opening or from the second opening to the third opening takes place by passage through at least one portion of the mechanical filter itself;

a passage of the fluid from the third opening to the first opening or from the third opening to the second opening takes place by passage through at least one portion of the mechanical filter itself.

In one aspect, the aforesaid plurality of operative configurations comprises at least:

a first operative configuration, in which said first opening receives a flow of fluid entering the device, said second opening sends the flow of filtered fluid exiting the device and said third opening is intercepted by a closure element;

a second operative configuration, in which said first opening receives a flow of fluid entering the device, said third opening sends the flow of filtered fluid exiting the device and said second opening is intercepted by a closure element;

a third operative configuration, in which said second opening receives a flow of fluid entering the device, said first opening sends the flow of filtered fluid exiting the device and said third opening is intercepted by said closure element;

a fourth operative configuration, in which said second opening receives a flow of fluid entering the device, said third opening sends the flow of filtered fluid exiting the device and said first opening is intercepted by said closure element a fifth operative configuration, in which said third opening receives a flow of fluid entering the device, said first opening sends the flow of filtered fluid exiting the device and said second opening is intercepted by a closure element;

a sixth operative configuration, wherein said third opening receives a flow of fluid entering the device, said second opening sends the flow of filtered fluid exiting the device and said first opening is intercepted by a closure element.

In one aspect, the device comprises said closure element, configured to intercept selectively either said first inlet/outlet opening, second inlet/outlet opening or third inlet/outlet opening.

In one aspect, in each operative configuration there is necessarily a passage of fluid through at least one portion of the mechanical filter.

In one aspect, the filtration chamber is laterally delimited by a lateral surface, above by a top surface and below by a bottom surface of the body of the device.

In one aspect, the filtering members comprise at least one magnetic filter associated with the body of the device and configured to collect substances and ferrous particles (or provided with ferromagnetic properties) that are present in the fluid to be treated, so as to separate the particles from the fluid that passes through the device and retain the particles inside the filtration chamber.

An independent aspect of the present invention relates to a heating system comprising a device according to one or more of the above aspects.

An independent aspect of the present invention relates to a method for filtering a fluid circulating in a plumbing and heating system, comprising the steps of:

preparing at least one device for filtering a fluid;
identifying a line coming from a plumbing and heating system, in particular a heating water return line from a system of heating elements, carrying a flow of water to be subjected to filtering;
identifying a line directed to a boiler of the plumbing and heating system, carrying thereto a flow of water subjected to filtration;
operating the device selectively in one of the aforesaid operative configurations.
 a first operative configuration, comprising the steps of:
  hydraulically connecting the first inlet/outlet opening to a line coming from a plumbing and heating system, in particular a heating water return line from a system of heating elements, to receive a flow of water to be subjected to filtering;
  hydraulically connecting the second inlet/outlet opening to a line directed to a boiler of the plumbing and heating system, to send thereto the flow of water following filtration;
  intercepting the third inlet/outlet opening by a closure element;
  introducing the flow of fluid entering the first opening, in the first sub-chamber so that it is necessarily directed to pass through at least the first wall of the mechanical filter, undergoing mechanical filtration, with retention of the separated material inside the first sub-chamber, and flowing into the second sub-chamber; preferably, part of the flow of fluid can pass through the third wall, with retention of the separated material inside the first sub-chamber, continue inside the third sub-chamber and from the third sub-chamber, by passing through the second wall (the third inlet/outlet opening being intercepted), flow into the second sub-chamber, the flow of fluid entering the first sub-chamber terminating filtration entirely in said second sub-chamber;
  preferably, subjecting the fluid to a magnetic filtration by at least one first magnetic filter at one or more of said sub-chambers;
  making the fluid exit from the second inlet/outlet opening, the third inlet/outlet opening being intercepted.
 a second operative configuration, comprising the steps of:
  hydraulically connecting the first inlet/outlet opening to a line coming from a plumbing and heating system, in particular a heating water return line from a system of heating elements, to receive a flow of water to be subjected to filtering;
  intercepting the second inlet/outlet opening by a closure element;
  hydraulically connecting the third inlet/outlet opening to a line directed to a boiler of the plumbing and heating system, to send thereto the flow of water following filtration;
  introducing the flow of fluid entering the first opening, in the first sub-chamber so that it is necessarily directed to pass through at least the third wall of the mechanical filter, undergoing mechanical filtration, with retention of the separated material inside the first sub-chamber, and flowing into the third sub-chamber; preferably, part of the flow of fluid can pass through the first wall, with retention of the separated material inside the first sub-chamber, continue inside the second sub-chamber and from the second sub-chamber, by passing through the second wall (the second inlet/outlet opening being intercepted), flow into the third sub-chamber, the flow of fluid entering the first sub-chamber terminating filtration entirely in said third sub-chamber;
  preferably, subjecting the fluid to a magnetic filtration by at least one first magnetic filter at one or more of said sub-chambers;
  making the fluid exit from the third inlet/outlet opening, the second inlet/outlet opening being intercepted;
 a third operative configuration, comprising the steps of:
  hydraulically connecting the second inlet/outlet opening to a line coming from a plumbing and heating system, in particular a heating water return line from a system of heating elements, to receive a flow of water to be subjected to filtering;
  intercepting the third inlet/outlet opening by a closure element;
  hydraulically connecting the first inlet/outlet opening to a line directed to a boiler of the plumbing and heating system, to send thereto the flow of water following filtration;
  introducing the flow of fluid entering the second opening, in the second sub-chamber so that it is necessarily directed so as to pass through at least the first wall of the mechanical filter, undergoing mechanical filtration, with retention of the separated material inside the second sub-chamber, and flowing into the first sub-chamber; preferably, part of the flow of fluid can pass through the second wall, with retention of the separated material inside the first sub-chamber, continue inside the second sub-chamber and from the second sub-chamber, by passing through the third wall (the third inlet/outlet opening being intercepted), flow into the first sub-chamber, the flow of fluid entering the first sub-chamber terminating filtration entirely in said first sub-chamber;
  preferably, subjecting the fluid to a magnetic filtration by at least one first magnetic filter at one or more of said sub-chambers;
  making the fluid exit from the first inlet/outlet opening, the third inlet/outlet opening being intercepted.
 a fourth operative configuration, comprising the steps of:
  hydraulically connecting the second inlet/outlet opening to a line coming from a plumbing and heating system, in particular a heating water return line from a system of heating elements, to receive a flow of water to be subjected to filtering;
  intercepting the first inlet/outlet opening by a closure element;
  hydraulically connecting the third inlet/outlet opening to a line directed to a boiler of the plumbing and heating system, to send thereto the flow of water following filtration;
  introducing the flow of fluid entering the first opening, in the first sub-chamber so that it is necessarily directed to pass through at least the second wall of the mechanical filter, undergoing mechanical filtration, with retention of the separated material inside the second sub-chamber, and flowing into the third sub-chamber; preferably, part of the flow of fluid can pass through the first wall, with retention of the separated material inside the second sub-chamber, continue inside the first sub-chamber and from the first sub-chamber, by passing through the third wall (the first inlet/outlet opening being intercepted), flow into the third sub-chamber, the flow of fluid entering the first sub-chamber terminating the filtration entirely in said third sub-chamber;

preferably, subjecting the fluid to a magnetic filtration by at least one first magnetic filter at one or more of said sub-chambers;

making the fluid exit from the third inlet/outlet opening, the first inlet/outlet opening being intercepted;

a fifth operative configuration, in which:
hydraulically connecting the third inlet/outlet opening to a line coming from a plumbing and heating system, in particular a heating water return line from a system of heating elements, to receive a flow of water to be subjected to filtering;

intercepting the second inlet/outlet opening by a closure element;

hydraulically connecting the first inlet/outlet opening to a line directed to a boiler of the plumbing and heating system, to send thereto the flow of water following filtration;

introducing the flow of fluid entering the third opening, in the third sub-chamber so that it is necessarily directed to pass through at least the third wall of the mechanical filter, undergoing mechanical filtration, with retention of the separated material inside the third sub-chamber, and flowing into the first sub-chamber; preferably, part of the flow of fluid can pass through the second wall, with retention of the separated material inside the third sub-chamber, continue inside the second sub-chamber and from the second sub-chamber, by passing through the first wall (the second inlet/outlet opening being intercepted), flow into the first sub-chamber, the flow of fluid entering the first sub-chamber terminating filtration entirely in said first sub-chamber;

preferably, subjecting the fluid to a magnetic filtration by at least one first magnetic filter at one or more of said sub-chambers;

making the fluid exit from the first inlet/outlet opening, the second inlet/outlet opening being intercepted.

a sixth operative configuration, comprising the steps of:
hydraulically connecting the third inlet/outlet opening to a line coming from a plumbing and heating system, in particular a heating water return line from a system of heating elements, and receiving a flow of water to be subjected to filtering;

intercepting the first inlet/outlet opening by a closure element;

hydraulically connecting the second inlet/outlet opening to a line directed to a boiler of the plumbing and heating system, to send thereto the flow of water following filtration;

introducing the flow of fluid entering the third opening, in the third sub-chamber so that it is necessarily directed to pass through at least the second wall of the mechanical filter, undergoing mechanical filtration, with retention of the separated material inside the third sub-chamber, and flowing into the second sub-chamber; preferably, part of the flow of fluid can pass through the third wall, with retention of the separated material inside the third sub-chamber, continue inside the first sub-chamber and from this, by passing through the first wall (the first inlet/outlet opening being intercepted), flow into the second sub-chamber, the flow of fluid entering the first sub-chamber terminating filtration entirely in said second sub-chamber;

preferably, subjecting the fluid to a magnetic filtration by at least one first magnetic filter at one or more of said sub-chambers;

making the fluid exit from the second inlet/outlet opening, the first inlet/outlet opening being intercepted.

Each of the aforesaid aspects of the invention can be taken on its own or in combination with any one of the claims or of the other disclosed aspects.

Further features and advantages will become more apparent from the detailed description of some example, but not exclusive embodiments, also including a preferred embodiment, of a device and a method for filtering a fluid circulating in a plumbing and heating system in accordance with the present invention. This description will be set out below with reference to the appended drawings, which are provided solely for indicative and therefore non-limiting purposes, in which:

FIG. 11A shows a section view, along the plane XII-XII, and in an exploded view along a longitudinal direction, with some parts removed, of the device of FIG. 10;

FIGS. 14 and 14A show, respectively, a central longitudinal section view and a cross section view of the device of FIG. 7 in a first operative configuration;

FIGS. 15 and 15A show, respectively, a central longitudinal section view and a cross section view of the device of FIG. 7 in a second operative configuration;

FIGS. 16 and 16A show, respectively, a central longitudinal section view and a cross section view of the device of FIG. 7 in a third operative configuration;

FIGS. 17 and 17A show, respectively, a central longitudinal section view and a cross section view of the device of FIG. 7 in a fourth operative configuration;

FIGS. 18 and 18A show, respectively, a central longitudinal section view and a cross section view of the device of FIG. 7 in a fifth operative configuration;

FIGS. 19 and 19A show, respectively, a central longitudinal section view and a cross section view of the device of FIG. 7 in a sixth operative configuration.

Figure 1:
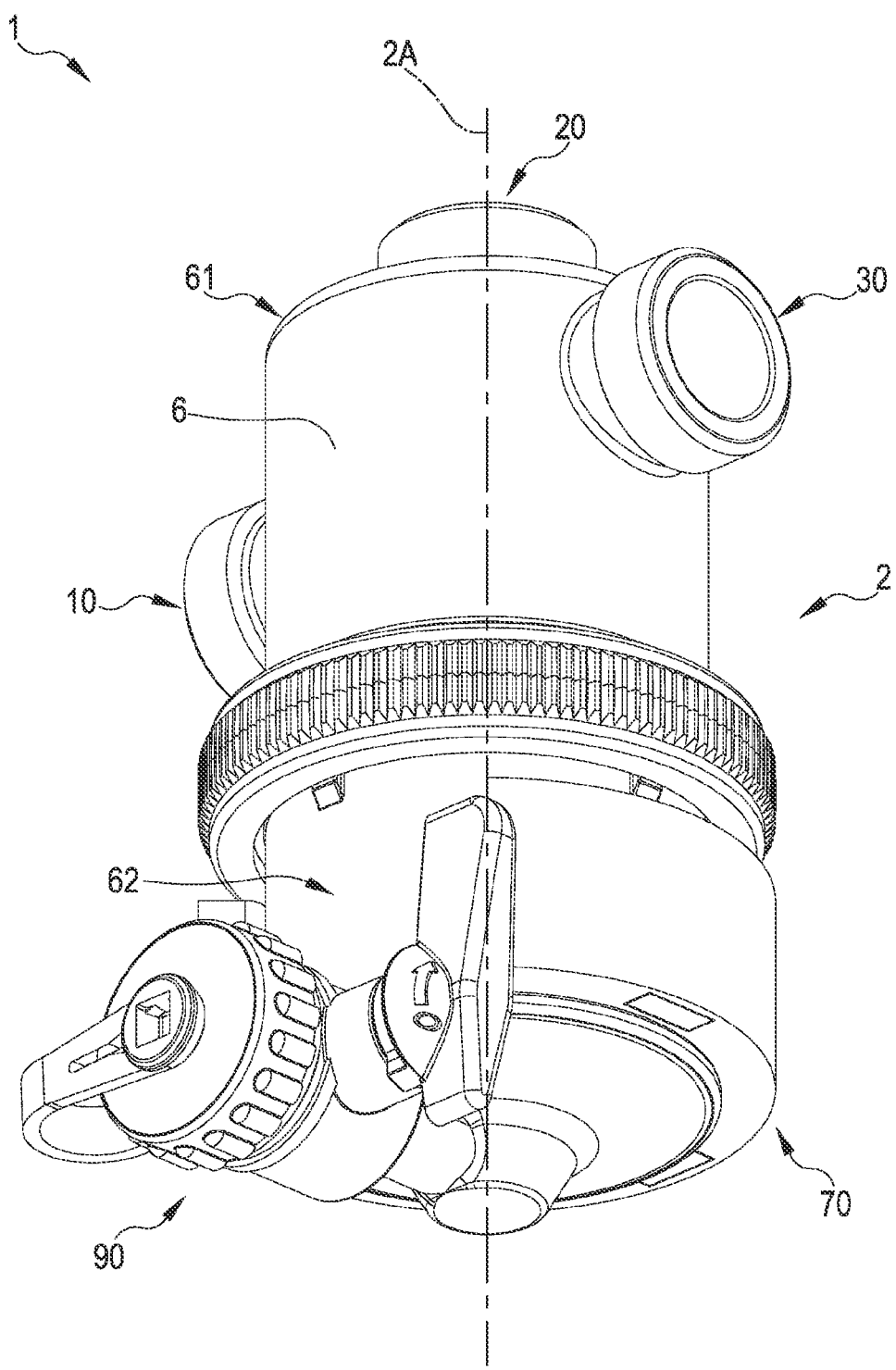
FIG. 1 is a perspective view that illustrates a possible embodiment of a device for filtering a fluid according to the present invention.
Figure 2:
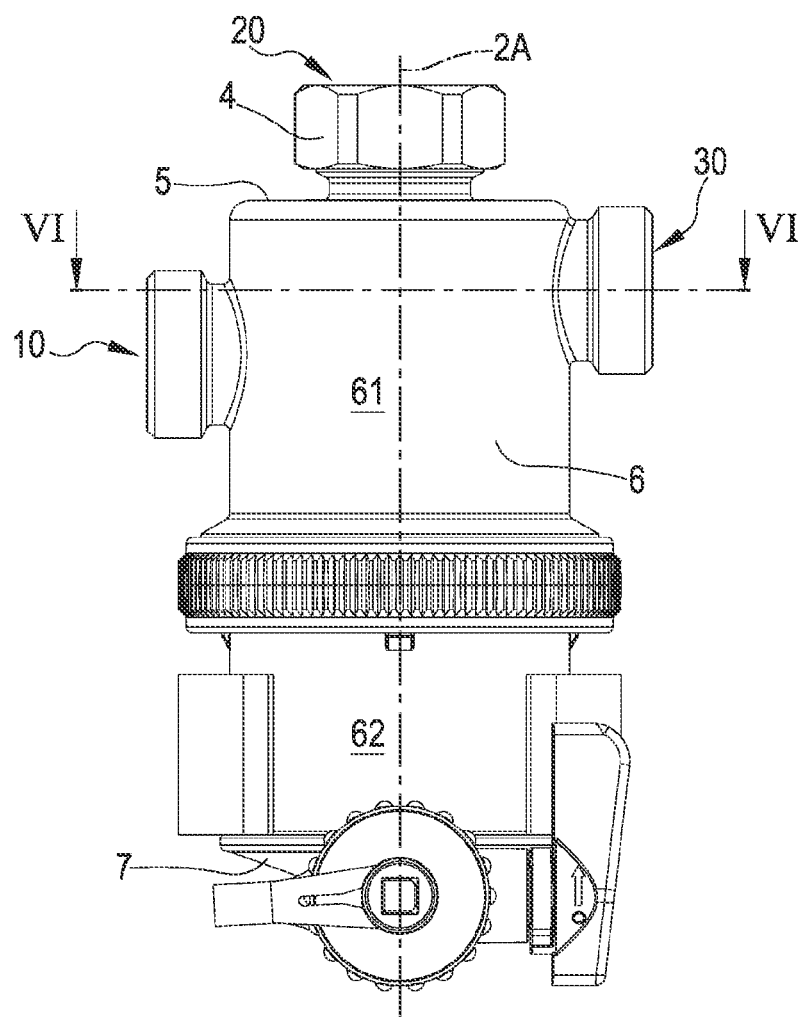
FIG. 2 shows a front view of the device of FIG. 1.

With reference to the figures cited, a device for filtering a fluid in accordance with the present invention is indicated in its entirety by the reference number 1. In general, the same reference number is used for elements that are the same or similar, possibly in variants of embodiments thereof.

The device 1 is destined to perform filtering of the fluid, typically water, circulating inside a plumbing and heating system, usually comprising piping and lines, valves, a boiler or a power generator, pumps, radiating elements (radiant bodies, radiators, floor coils etc.), utilities, etc.

In the figures, the system for which the device is destined is not shown or disclosed in detail because it is per se known in the technical sector of the present invention.

The device 1 comprises first of all a body 2 defining therewithin a filtration chamber 3 destined to be passed through by the fluid to be subjected to filtration. The body 2 is provided with a first inlet/outlet opening 10, a second inlet/outlet opening 20 and a third inlet/outlet opening 30: each of which sets in communication the filtration chamber 3 with the outside of the device and is configured to be associated with a line of the system to receive therefrom, or send thereto a fluid entering or exiting said body of the device.

The device 1 is configured to operate a passage of fluid through the filtration chamber 3, from an opening between said first inlet/outlet opening 10, second inlet/outlet opening 20 and third inlet/outlet opening 30 to a further opening between said first inlet/outlet opening 10, second inlet/outlet opening 20 and third inlet/outlet opening 30. The two openings (between the aforesaid three openings 10, 20 and 30) between which the fluid passes can be selected as desired according to a plurality of operative configurations, as will emerge more clearly below.

The device 1 comprises filtering members 40, housed at least partially inside the filtration chamber 3, or associated with the body 2 of the device, and operatively interposed between the three inlet/outlet openings 10, 20 and 30, to perform filtering of the fluid passing through the filtration chamber 3.

The filtering members comprise at least one mechanical filter 41 configured to operate a mechanical separation of solid substances and particles present in the fluid itself to be treated from the fluid in which the solid particles are suspended.

This mechanical filter 41 is arranged inside the filtration chamber 3, and is suitably structured, so as to divide the mechanical filter 41, preferably longitudinally, into a first sub-chamber A, a second sub-chamber B and a third sub-chamber C, in which:

the first sub-chamber A is in fluid communication, without passage through the mechanical filter 41, only with the first inlet/outlet opening 10, and not with the second 20 and the third inlet/outlet opening 30;

the second sub-chamber B is in fluid communication, without passage through the mechanical filter 41, only with the second inlet/outlet opening 20, and not with the first 10 and the third 30 inlet/outlet opening;

the third sub-chamber C is in fluid communication, without passage through the mechanical filter, only with the third inlet/outlet opening 30, and not with the first 10 and the second 20 inlet/outlet opening.

In this manner the fluid transiting in the filtration chamber 3, in each of said pluralities of operative configurations, necessarily passes through—at least partially—the mechanical filter 41 to pass between the first sub-chamber A, the second sub-chamber B and the third sub-chamber C, i.e. to pass between one sub-chamber and another Preferably, the device comprises a closure element 4 configured to intercept selectively one of the aforesaid first inlet/outlet opening 10, second inlet/outlet opening 20 and third inlet/outlet opening 30.

According to one preferred embodiment, the plurality of operative configurations comprises:

a first operative configuration, in which the first opening 10 receives a flow of fluid entering the device, the second opening 20 sends the flow of filtered fluid exiting the device and the third opening is intercepted by the closure element 4;

a second operative configuration, in which the first opening 10 receives a flow of fluid entering the device, the third opening 30 sends the flow of filtered fluid exiting the device and the second opening 20 is intercepted by the closure element 4;

a third operative configuration, in which the second opening 20 receives a flow of fluid entering the device, the first opening 10 sends the flow of filtered fluid exiting the device and the third opening 30 is intercepted by the closure element 4;

a fourth operative configuration, in which the second opening 20 receives a flow of fluid entering the device, the third opening 30 sends the flow of filtered fluid exiting the device and the first opening 10 is intercepted by the closure element (4);

a fifth operative configuration, in which the third opening 30 receives a flow of fluid entering the device, the first opening 10 sends the flow of filtered fluid exiting the device and the second opening 20 is intercepted by the closure element 4;

a sixth operative configuration, in which the third opening 30 receives a flow of fluid entering the device, the second opening 20 sends the flow of filtered fluid exiting the device and the first opening 10 is intercepted by the closure element 4.

The closure element 4 is preferably a cap, which can be associated removably with the openings.

It is apparent that in each of the operative configurations one of the three openings acts as an inlet, another of the three openings acts as an outlet and the remaining opening is closed and preferably not used.

The operative configurations are shown in FIGS. 14-19 and 14A-19A, and will be examined in greater detail further on in the description.

It should be considered that, in each of the six configurations identified above, regardless of which opening receives the flow of fluid entering the device, regardless of which sends the flow of filtered fluid exiting the device, and regardless of which is intercepted, the mechanical filter 41 is always positioned in the same manner and operates correctly without the position or configuration needing to be modified.

As shown by way of example in the embodiments illustrated in the figures, preferably the passage between the first sub-chamber A and the second sub-chamber B, between the second sub-chamber B and the third sub-chamber C and between the first sub-chamber A and the third sub-chamber C necessarily takes place through the mechanical filter 41. In other words, the first sub-chamber A, the second sub-chamber B and the third sub-chamber C communicate with one another preferably only through the mechanical filter 41.

Preferably, the mechanical filter 41 has, at least in one portion thereof, a structure provided with a plurality of passages 42 having a given filtering section, such that the passage of the fluid through the mechanical filter determines the retention, on one side of the mechanical filter from which the fluid passing through the mechanical filter is coming, of the substances and particles present in the fluid and having larger dimensions than said filtering section.

Preferably the passages 42 are holes or openings passing through the two opposite sides of the filter. The passages are preferably distributed preferably uniformly, over the entire structure of the mechanical filter.

Preferably, the structure of the mechanical filter has a mesh lattice (or a grid or a net or a fabric) or a plurality of microholes.

It should be observed that the holes 42 indicated in the figures are only indicative; these holes can have different dimensions and/or shapes, depending on the different applications and the desired filtering section.

Preferably, the mechanical filter 41 has the form a thin layer or membrane, with a given shape and has a longitudinal extension between an upper end 46 and a lower end 47 (with reference to the orientation shown in the figures).

Reference is now made, in particular, only to the mechanical filter 41, as illustrated in the figures relating to the different embodiments provided by way of example.

Preferably, the mechanical filter 41 has a given cross section, which is orthogonal to the longitudinal extension thereof. This section is preferably substantially constant along the extension of the filter.

Preferably, the mechanical filter 41 has a substantially Y shape, configured to divide the filtration chamber 3 into the first sub-chamber A, second sub-chamber B and third sub-chamber C.

Preferably, the mechanical filter 41 comprises:
a first wall P1 interposed between and separating the first inlet/outlet opening 10 and the second inlet/outlet opening 20;
a second wall P2 interposed between and separating the second inlet/outlet opening 20 and the third inlet/outlet opening 30.
a third wall P3 interposed between and separating the first inlet/outlet opening 10 and the third inlet/outlet opening 30.

Preferably, the first sub-chamber A is defined between the first wall P1 and the third wall P3, the second sub-chamber B is defined between the first wall P1 and the second wall P2 and the third sub-chamber C is defined between the second wall P2 and the third wall P3.

Preferably, said first wall P1, second wall P2 and third wall P3 each has, at least in one respective portion, a structure provided with the aforesaid plurality of passages 42 having a determined filtering section, so that the passage of the fluid through the wall determines the retention, on one side of the wall from which the fluid passing through the mechanical filter is coming, of the substances and particles present in the fluid and having larger dimensions than the filtering section.

Preferably said first wall P1, second wall P2 and third wall P3 is each configured to filter mechanically a flow of fluid with both sides thereof, according to the direction from which the fluid to be filtered is coming.

Preferably, the first wall P1, the second wall P2 and the third wall P3 overall constitute the entire mechanical filter 41. Preferably, the first wall P1, the second wall P2 and the third wall P3 are joined to one another so as to form the mechanical filter 41, in a single piece. Preferably, the mechanical filter 41 is monobloc.

Preferably, the first wall P1, the second wall P2 and the third wall P3 extend vertically inside the filtration chamber 3.

Preferably, the first wall P1, the second wall P2 and the third wall P3 each have the form of a flat or curved thin layer.

Preferably, said first wall P1, second wall P2 and third wall P3 each constitutes a filtering septum.

Preferably, as shown by way of example in the figures, the mechanical filter 41 has the aforesaid Y shape in a cross section which is preferably orthogonal to the longitudinal extension of the mechanical filter 41 itself.

Preferably, the first wall P1, the second wall P2 and the third wall P3 are joined, in the mechanical filter, at a junction line 43, which is preferably vertical, which is common to the three walls.

Preferably, the junction line 43 corresponds, in section, to the centre of the Y shape of the section of the mechanical filter 41.

Preferably, at the junction line 43, the three sub-chambers A, B and C of the filtration chamber 3 converge without entering into fluid communication except through the mechanical filter.

Preferably the joining of the first sub-chamber A, of the second sub-chamber B and of the third sub-chamber C overall defines the entire filtration chamber 3.

Preferably, the first sub-chamber A, the second sub-chamber B and the third sub-chamber C have a section, which is orthogonal to the longitudinal extension of the substantially constant mechanical filter 41.

Substantially, the mechanical filter 41 according to the present invention has a "trilobed" structure with three sides, preferably thin or laminated, consisting of the third walls. The presence of third walls enables the filtration chamber to be divided into three sub-chambers, one for each inlet/outlet opening. By selecting suitably the openings that act as an inlet and outlet for the fluid from the device, it is always possible—owing to the mechanical filter shaped and configured according to the present invention—to obtain an effective filtration of the fluid without modifying or moving any element inside the device.

Preferably, the mechanical filter 41 is so structured that:
the fluid in the first sub-chamber A can pass into the second sub-chamber B by passing through the first wall P1 and in the third sub-chamber C by passing through the third wall P3;
the fluid in the second sub-chamber B can pass into the first sub-chamber A by passing through the first wall P1 (from a side opposite this wall with respect to the passage through from the first to the second sub-chamber) and into the third sub-chamber C by passing through the second wall P2;
the fluid in the third sub-chamber C can pass into the first sub-chamber A by passing through the third wall P3

(from a side opposite this wall with respect to the passing through from the first to the third sub-chamber) and into the second sub-chamber B by passing through the second wall P2 (from a side opposite this wall with respect to the passing through from the second to the third sub-chamber).

If the fluid moves from a first side of a wall to a second side of the wall, the substances and particles present in the fluid having larger dimensions than said filtering section are retained on the first side. Vice versa, if the fluid moves from the second side of the wall to the first side of the wall, the substances and particles present in the fluid having larger dimensions than said filtering section are retained on the second side.

The mechanical filter is preferably so conformed as to define three sub-chambers A, B and C wherein each sub-chamber is directly adjacent to the other two sub-chambers, and each pair of sub-chambers is separated by one of said walls of the mechanical filter.

Preferably, the first sub-chamber A and the second sub-chamber B are separated from the first wall P1, the second sub-chamber B and the third sub-chamber C are separated from the second wall P2, and the third sub-chamber C and the first sub-chamber A are separated from the third wall P3.

Preferably, the mechanical filter 41 is configured to operate in a single use position, maintained for each of said pluralities of operative configurations adopted by the device, in which:

prevents a direct passage of the fluid, without passing through of at least one portion (or at least one wall) of the mechanical filter itself, from the first opening 10 to the second opening 20 or from the first opening 10 to the third opening 30;

prevents a direct passage of the fluid, without passing through of at least one portion (or at least one wall) of the magnetic filter itself, from the second opening 20 to the first opening 10 or from the second opening 20 to the third opening 30;

prevents a direct passage of the fluid, without passing through of at least one portion (or at least one wall) of the magnetic filter itself, from the third opening 30 to the first opening 10 or from the third opening 30 to the second opening 20.

In use, the mechanical filter 41 does not need to be moved when the operative configuration adopted by the device 1 varies.

In other words, the mechanical filter 41 is configured to operate in a single use position, maintained for each of said pluralities of operative configurations adopted by the device, in which:

a passage of the fluid from the first opening 10 to the second opening 20 or from the first opening 10 to the third opening 30 takes place by passage through at least one portion of the mechanical filter 41 itself;

a passage of the fluid from the second opening 20 to the first opening 10 or from the second opening 20 to the third opening 30 takes place by passage through the mechanical filter 41 itself;

a passage of the fluid from the third opening 30 to the first opening 10 or from the third opening 30 to the second opening 20 takes place by passage through the mechanical filter 41 itself.

In the figures showing the mechanical filter 41, the upper end 46 of the mechanical filter 41 along the longitudinal extension thereof points upwards, whereas the lower end 47 faces downwards.

Preferably, the mechanical filter 41 is made of a single piece. Preferably, the mechanical filter 41 is made of plastics or metal, for example stainless steel.

According to the embodiments shown by way of example in the figures, the body 2 of the device has a substantially cylindrical shape and has an axis of longitudinal extension 2A, an upper surface 5, an outer lateral surface 6 and a lower surface 7.

Preferably, the body has a solid rotation shape around the axis of longitudinal extension 2A and has radial symmetry around the axis of longitudinal extension 2A.

Preferably, the first inlet/outlet opening 10 and the third inlet/outlet opening 30 are located on the outer lateral surface 6 of the body 2 of the device and on sides opposite the filtration chamber 3.

Preferably, but not necessarily, the second inlet/outlet opening 20 is located on the upper surface 5 of the body 2 of the device.

Preferably, the first inlet/outlet opening 10, the second inlet/outlet opening 20 and the third inlet/outlet opening 30 have a circular section and each have a respective central axis (the central axes of the openings are indicated in the figure respectively with 10A, 20A and 30A).

Preferably, the central axis 20A of the second inlet/outlet opening 20 coincides with the axis of longitudinal extension 2A of the body 2 of the device.

Preferably, the axis of longitudinal extension 2A of the body 2 of the device coincides with the longitudinal extension of the mechanical filter 41.

Preferably, the respective central axes 10A and 30A of the first opening 10 and of the third inlet/outlet opening 30 intersect the axis of longitudinal extension 2A of the body 2 of the device.

Preferably, the respective central axes 10A and 30A of the first inlet/outlet opening 10 and of the third inlet/outlet opening 30 are orthogonal to the axis of longitudinal extension 2A of the body 2 of the device.

In one possible embodiment (not shown) the respective central axes 10A and 30A of the first inlet opening 10 and of the third inlet/outlet opening 30 can be coincident with one another.

Figure 3:
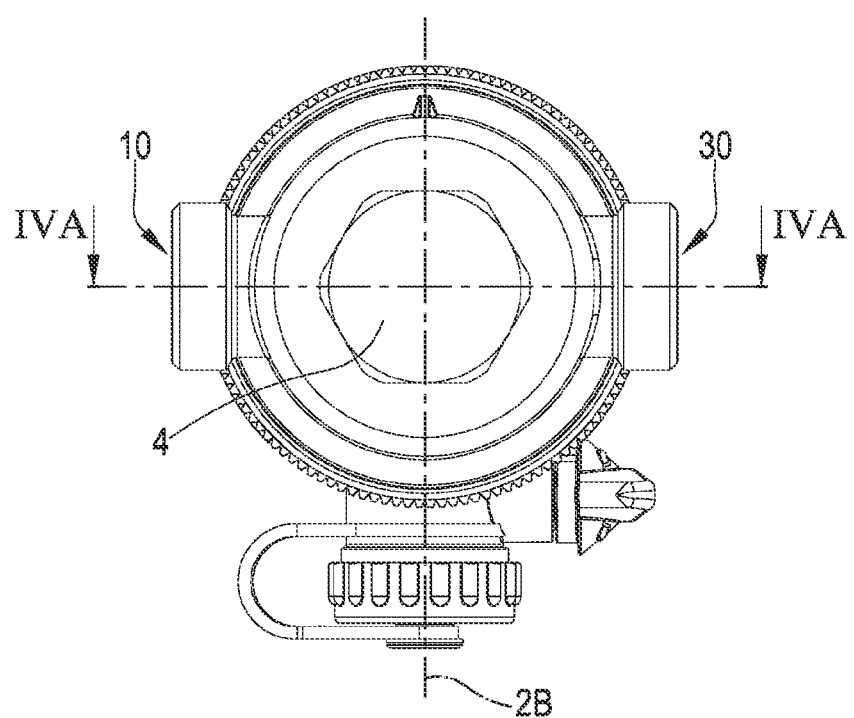
FIG. 3 shows a top view of the device of FIG. 1.
Figure 4:
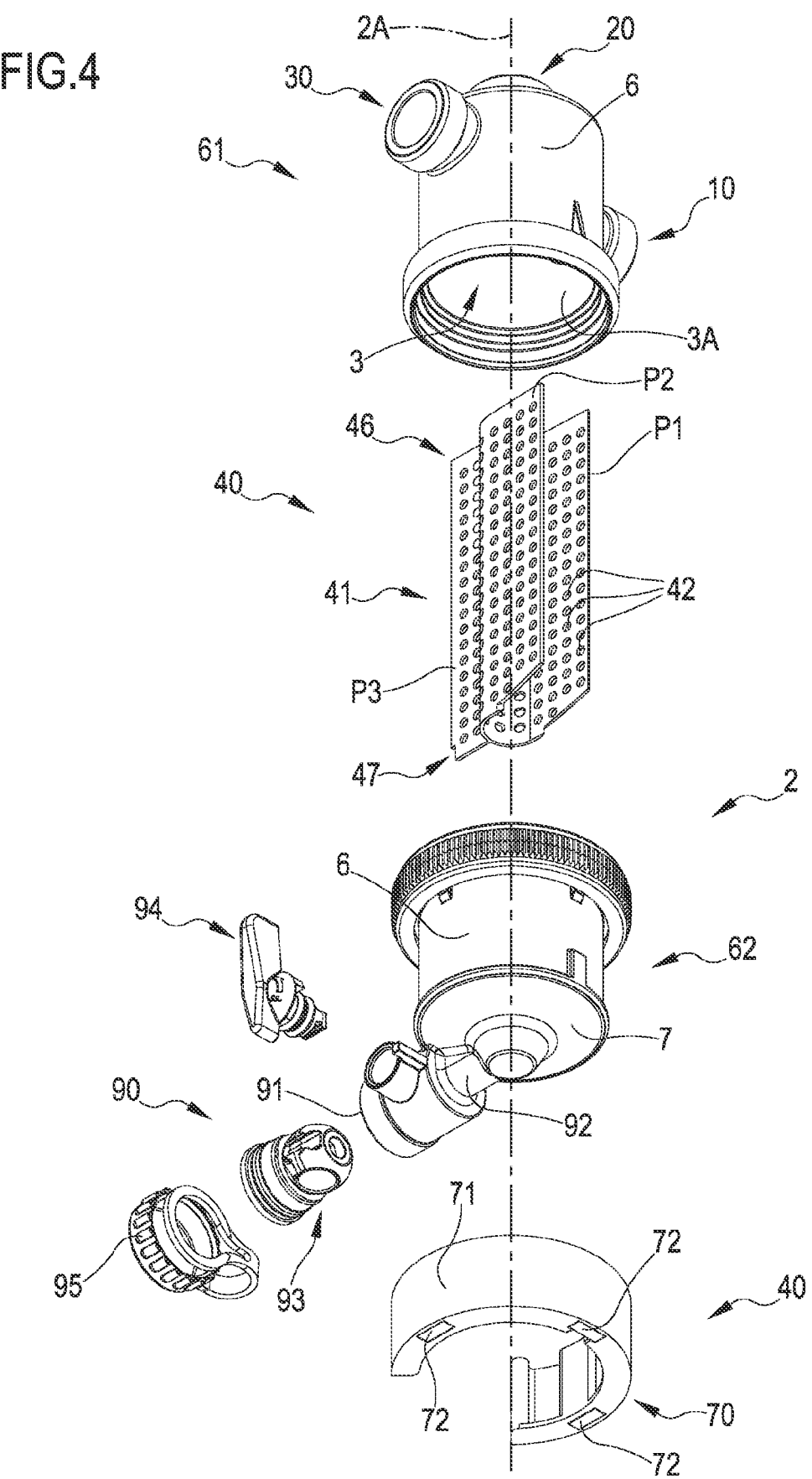
FIG. 4 shows an exploded prospective view of the device of FIG. 1.
Figure 4A:
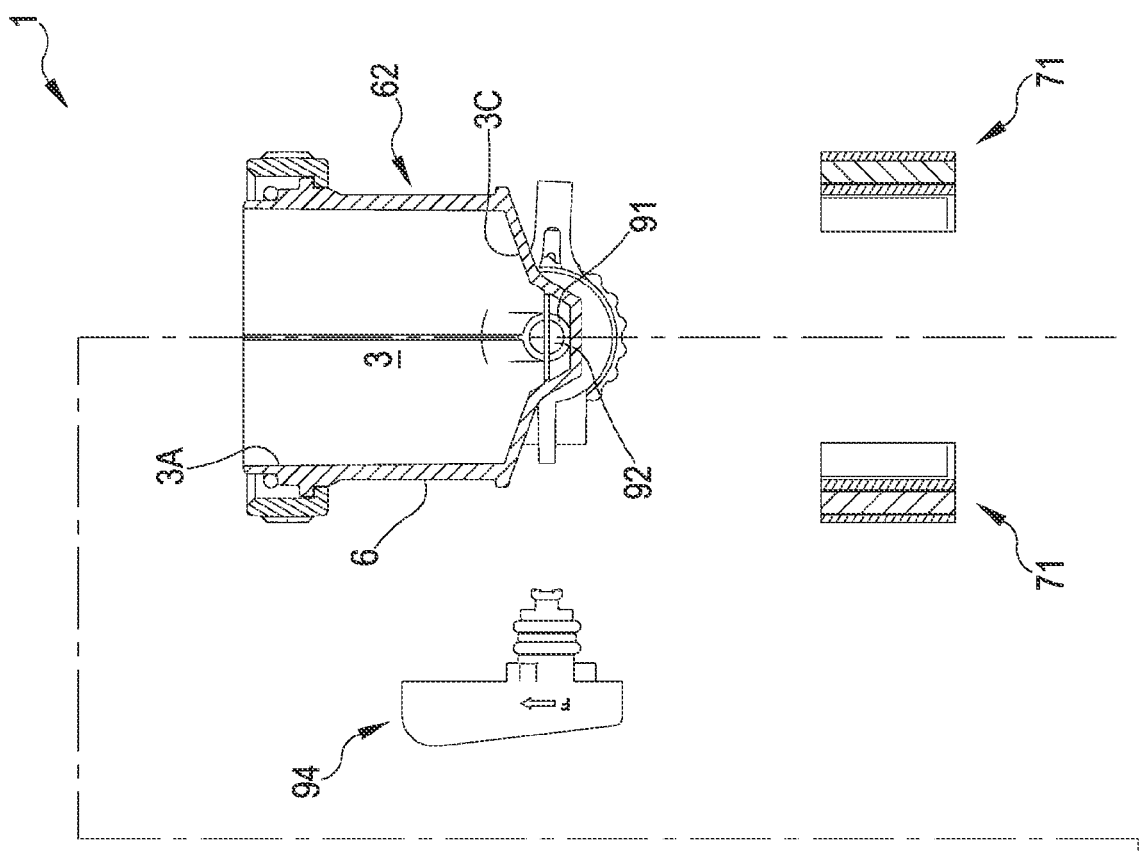
FIG. 4A shows a section view, along the plane IVA-IVA, and an exploded view, along a longitudinal direction, with some parts removed, of the device of FIG. 1.
Figure 4A:
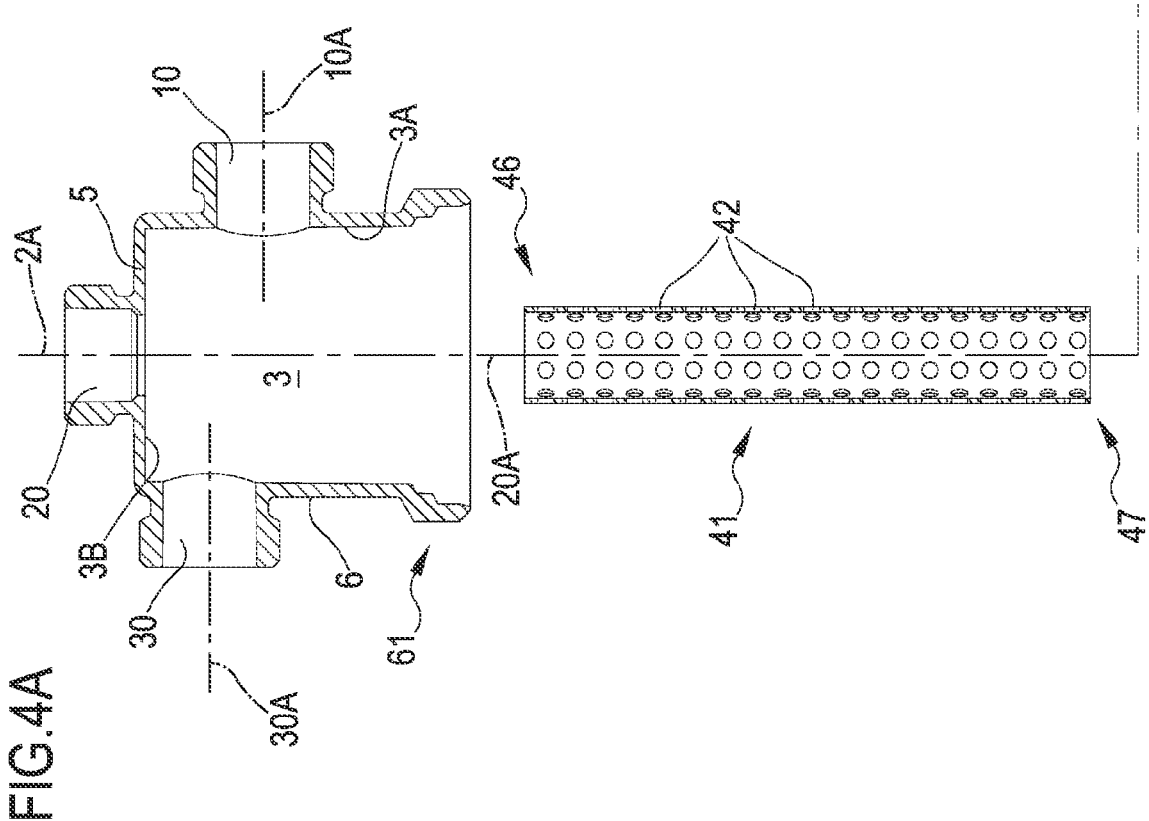
Figure 5:
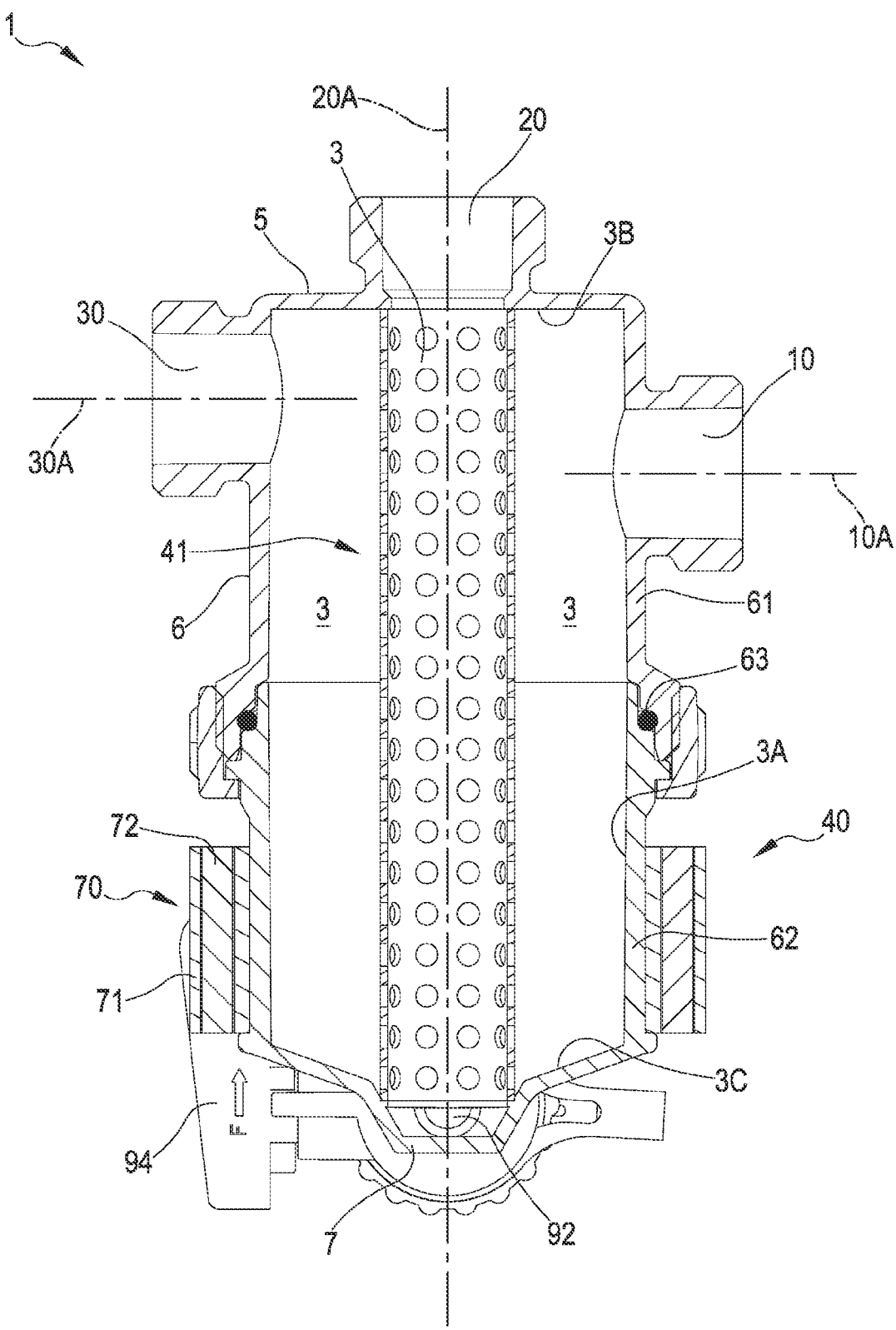
FIG. 5 shows the device of FIG. 1, sectioned along the plane IVA-IVA, in assembled condition.
Figure 6:
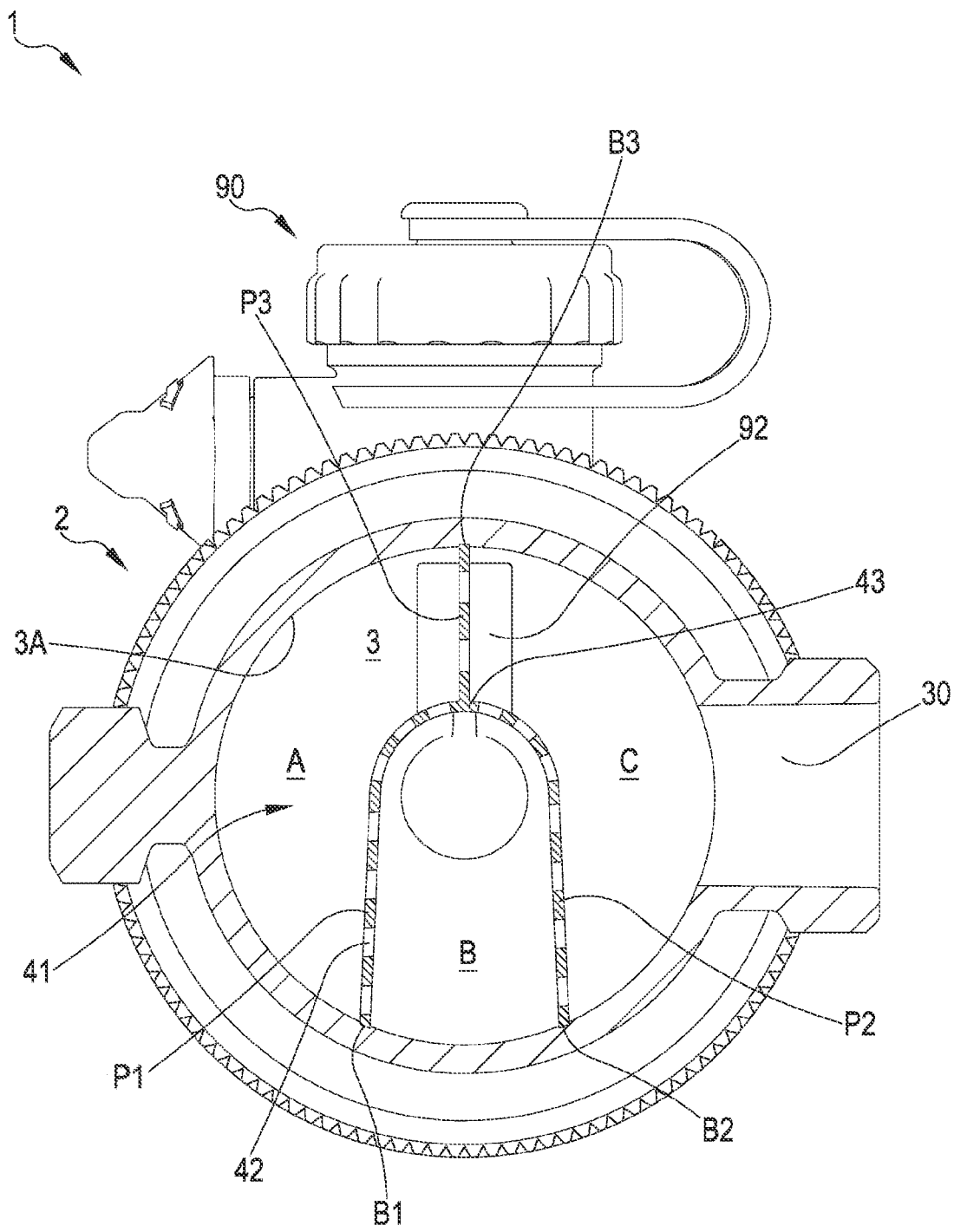
FIG. 6 shows the device of FIG. 1, sectioned along the transverse plane VI-VI, in assembled condition.
Figure 7:
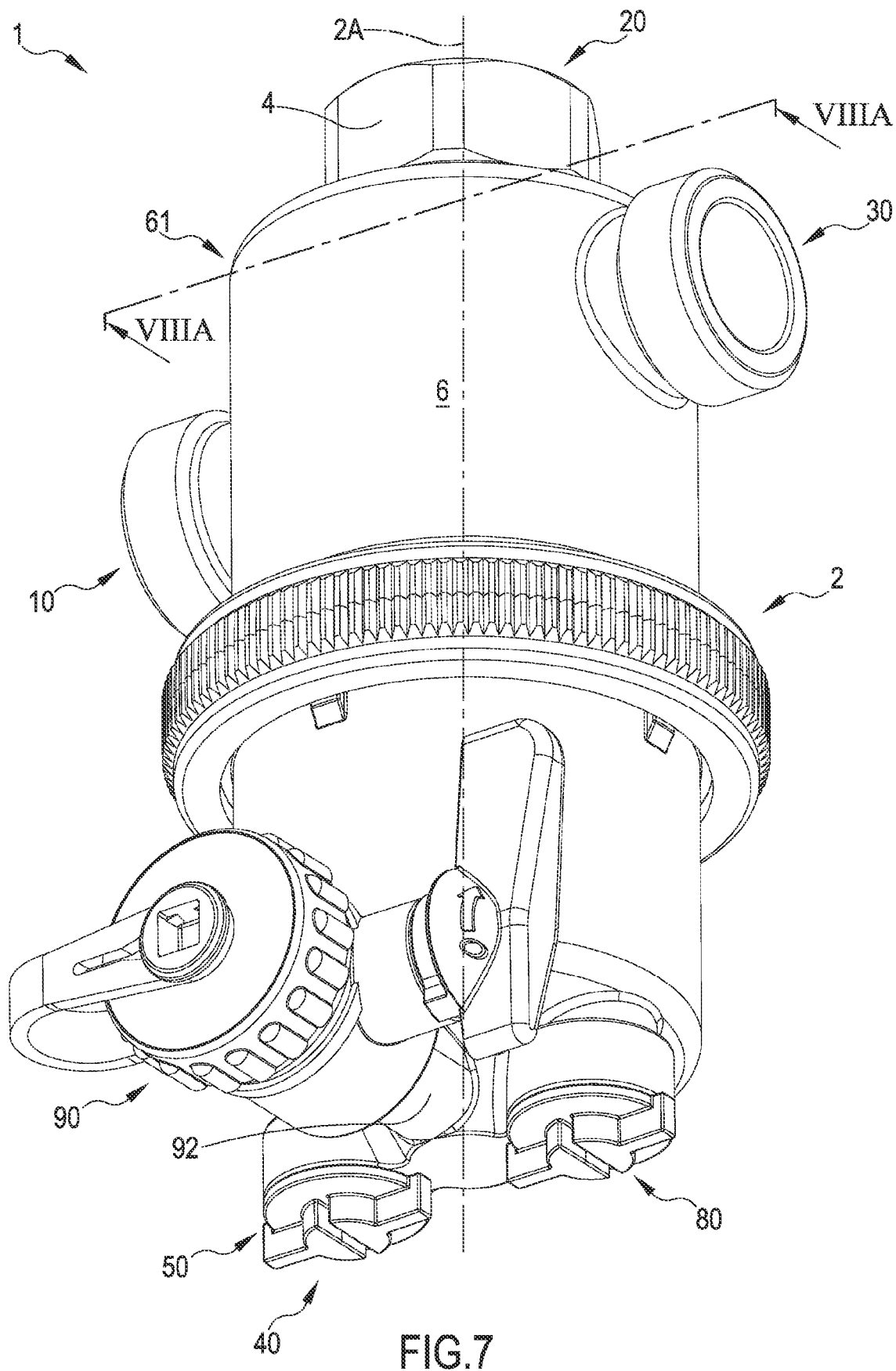
FIG. 7 is a perspective view that illustrates a further possible embodiment of a device for filtering a fluid according to the present invention.
Figure 8:
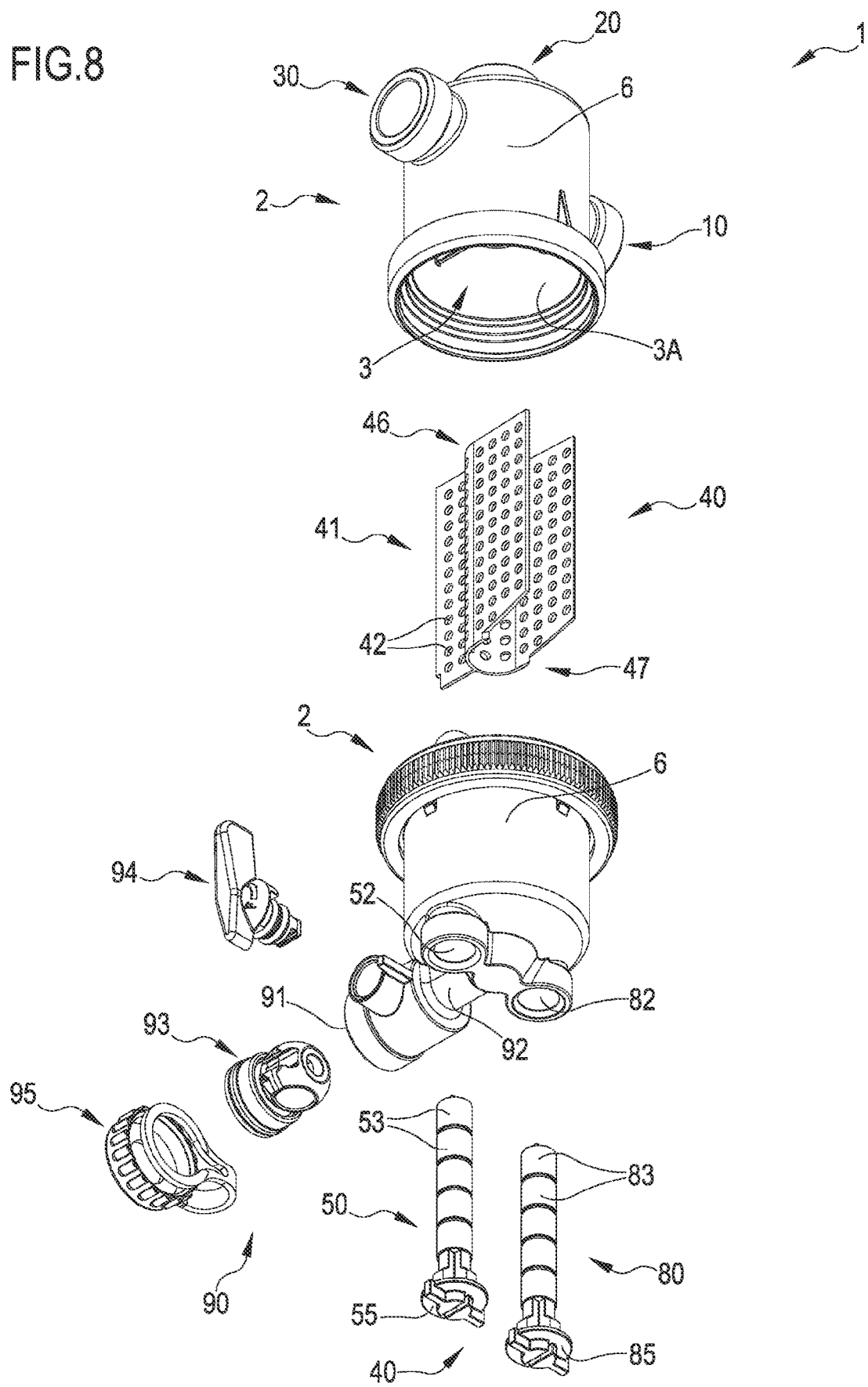
FIG. 8 shows an exploded prospective view of the device of FIG. 7.
Figure 8A:
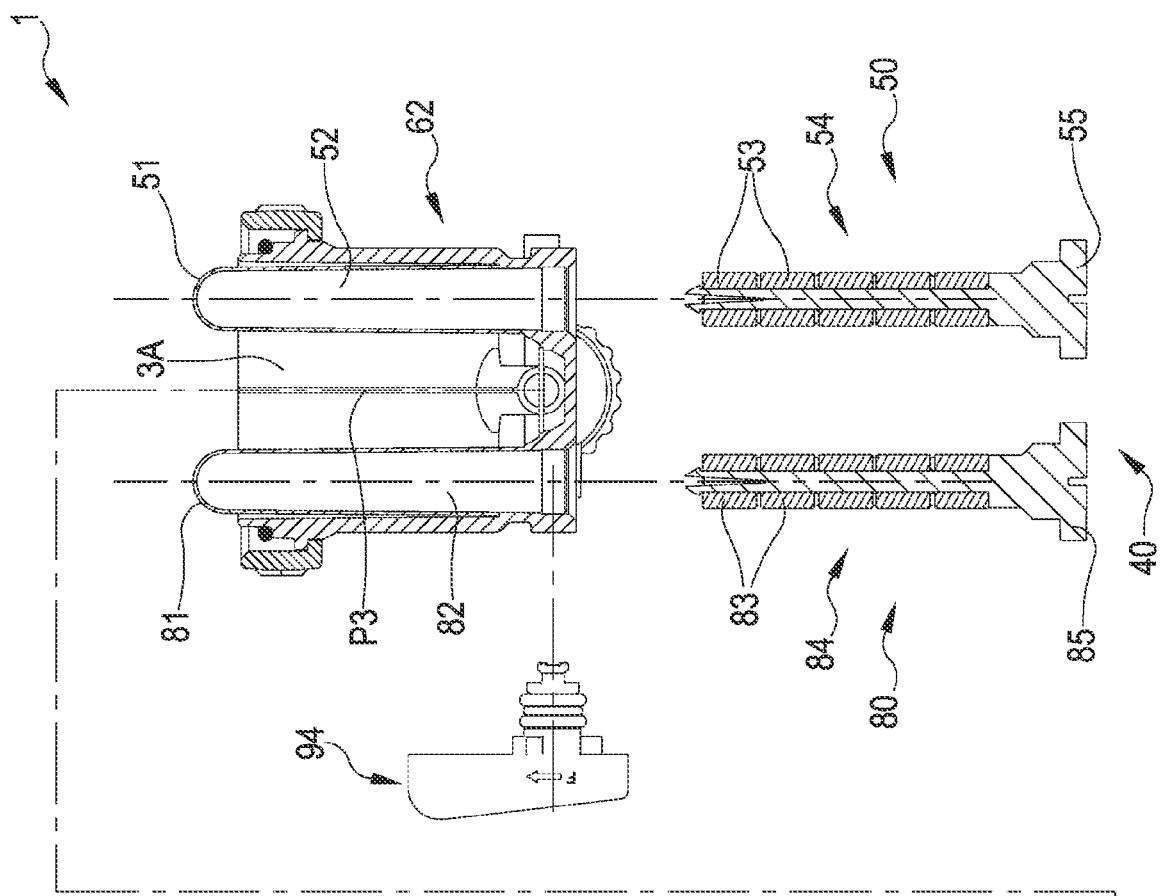
FIG. 8A shows a section view, along the plane VIIIA-VIIIA, and an exploded view, along a longitudinal direction, with some parts removed, of the device of FIG. 7.
Figure 8A:
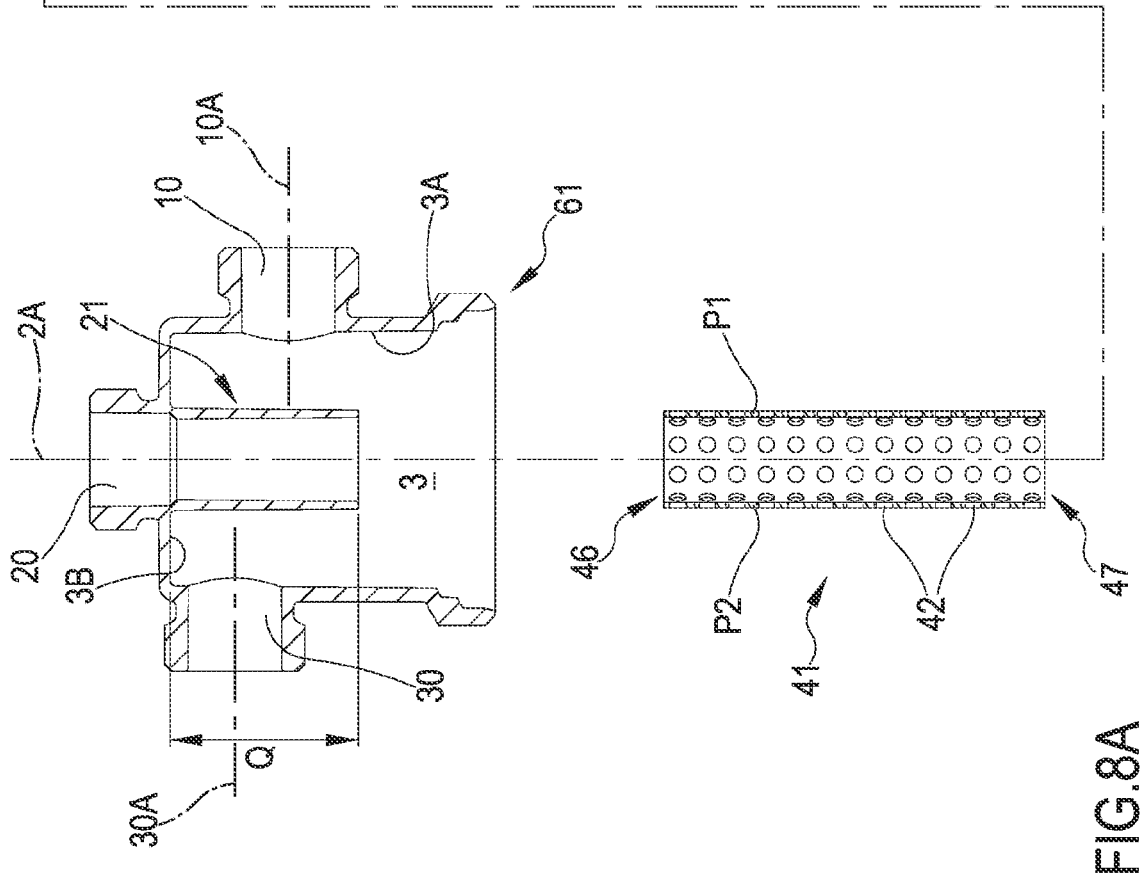

Preferably, the body of the device has a central plane of symmetry IVA-IVA on which the axis of longitudinal extension 2A lies, this central plane of symmetry dividing the body 2 of the device into two identical halves. The plane IVA-IVA is indicated in FIG. 3, and the sections of FIGS. 4A, 5, 8A, 9, 11A, 12 and 14-19 are made in respect thereto.

The body of the device is substantially symmetrical also with respect to a median plane 2B, on which the axis of longitudinal extension 2A lies and which is orthogonal to the central plane of symmetry IVA-IVA.

Preferably, all three respective central axes 10A, 20A and 30A of the first opening 10, of the second opening 20 and of the third opening 30 lie on the plane of symmetry IVA-IVA of the body 2 of the device.

According to a further definition, in accordance with the embodiments shown in the figures, the mechanical filter 41 has a "tuning fork" section, i.e. a Y-shaped section with two curved walls; this shape is particularly effective because it enables the second inlet outlet opening 20 to be enveloped above, making the second sub-chamber B around the second opening 20 when the second opening is placed above the body of the device.

If all three inlet/outlet openings 10, 20 and 30 are positioned on the lateral surface 6 of the body 2, the mechanical filter 41 could adopt a substantially three-point star shape in section view.

It should be noted that, on the basis of the shape of the body 2 of the device and of the positioning of the inlet/outlet openings, the walls that form the mechanical filter 41 can be straight or shaped.

In the embodiments shown by way of example in the figures, the first wall P1 and the second wall P2 are the same as one another and specular with respect to a longitudinal axial plane (through which the axis 2A passes); the third wall P3 moreover lies on this plane.

To sum up, the walls of the mechanical filter can be conformed and structured differently provided, from a functional point of view, that they divide the filtration chamber into the three sub-chambers without a fluid exchange except through the walls, to ensure filtering in every operative configuration.

Owing to this, it is not possible for the fluid to pass from one of the three inlet/outlet openings to another without first passing through at least one wall of the mechanical filter, and thus without having been suitably filtered.

Preferably, the mechanical filter 41 is divided symmetrically into two halves by one plane (corresponds to the median plane 2B in FIG. 3) on which the axis of longitudinal extension 2A of the body 2 lies.

Preferably, the filtration chamber 3 is laterally delimited by a lateral surface 3A, above by a top surface 3B and below by a bottom surface 3C of the body 2 of the device.

Preferably, the mechanical filter 41 is positioned longitudinally between the bottom surface 3C and the top surface 3B of the filtration chamber of the body 2 of the device.

Preferably, the filtration chamber 3 has a prevalent longitudinal extension, from the bottom surface 3C to the top surface 3B, and the mechanical filter 41 divides the filtration chamber 3 into the aforesaid first sub-chamber A, second sub-chamber B and third sub-chamber C so that each sub-chamber also extends longitudinally, from one respective portion of the bottom surface to one respective portion of the top surface.

Preferably, the first sub-chamber A, the second sub-chamber B and the third sub-chamber C are laterally adjacent and alongside one another, preferably radially alongside, and each constitute a longitudinal sector of the filtration chamber 3.

Preferably, the mechanical filter 41 has a prevalent dimension, which constitutes a height of the mechanical filter 41, along a direction coinciding with the axis of longitudinal extension 2A of the body.

Preferably, the aforesaid height of the mechanical filter 41 corresponds substantially to the distance between the top surface 3B and the bottom surface 3C of the filtration chamber 3, such that the mechanical filter is in contact above and below with these surfaces of the filtration chamber 3.

Preferably, the Y shape of the mechanical filter, on a plane orthogonal to the axis of longitudinal extension 2A of the body 2, has overall a dimension corresponding to a radial dimension (preferably a diameter) of the filtration chamber 3, such that the mechanical filter is in contact with the lateral surface 3A of the filtration chamber 3.

Preferably, first wall P1, second wall P2 and third wall P3 of the mechanical filter 41 each terminates laterally in contact with the lateral surface 3A of the filtration chamber 3.

Preferably, the first wall P1, the second wall P2 and the third wall P3 terminate, on a side opposite the junction line 43, with respective end edges B1, B2 and B3, in contact with the lateral surface 3A of the filtration chamber 3, such that:
- the end edge B1 of the first wall P1 is set in contact with a first line (or segment) of the lateral surface 3A interposed between the first inlet/outlet opening 10 and the second inlet/outlet opening 20 and separating the first sub-chamber A from the second sub-chamber B;
- the respective end edge B2 of the second wall P2 is set in contact with a second line (or segment) of the lateral surface 3A interposed between the second inlet/outlet opening 20 and the third inlet/outlet opening 30 and separating the second sub-chamber B from the third sub-chamber C;
- the respective end edge B3 of the third wall P3 is set in contact with a third line (or segment) of the lateral surface 3A interposed between the third inlet/outlet opening 30 and the first inlet/outlet opening 10 and separating the third sub-chamber C from the first sub-chamber A.

Preferably, the mechanical filter, at the aforesaid end edges B1, B2 and B3, is in contact and/or fluid-tight with the lateral surface 3A (in particular with the aforesaid lines of the lateral surface 3A), with the top surface 3B and/or with the bottom surface 3C.

According to one possible embodiment, shown by way of example in FIGS. 7-9A, the body of the device can be provided with a dividing structure 21 extending inside the filtration chamber 3 from the top surface 3B to the upper end 46 of the mechanical filter 41.

Preferably, the dividing structure 21 extends longitudinally continuously with respect to the mechanical filter 41, and combines with the latter to divide longitudinally the filtration chamber 3 into said first sub-chamber A, second sub-chamber B and third sub-chamber C.

Preferably, the dividing structure 21 has the same shape, in a section, which is orthogonal to the axis of longitudinal extension 2A, as the mechanical filter 41, and in particular has the same Y shape.

Figure 9:
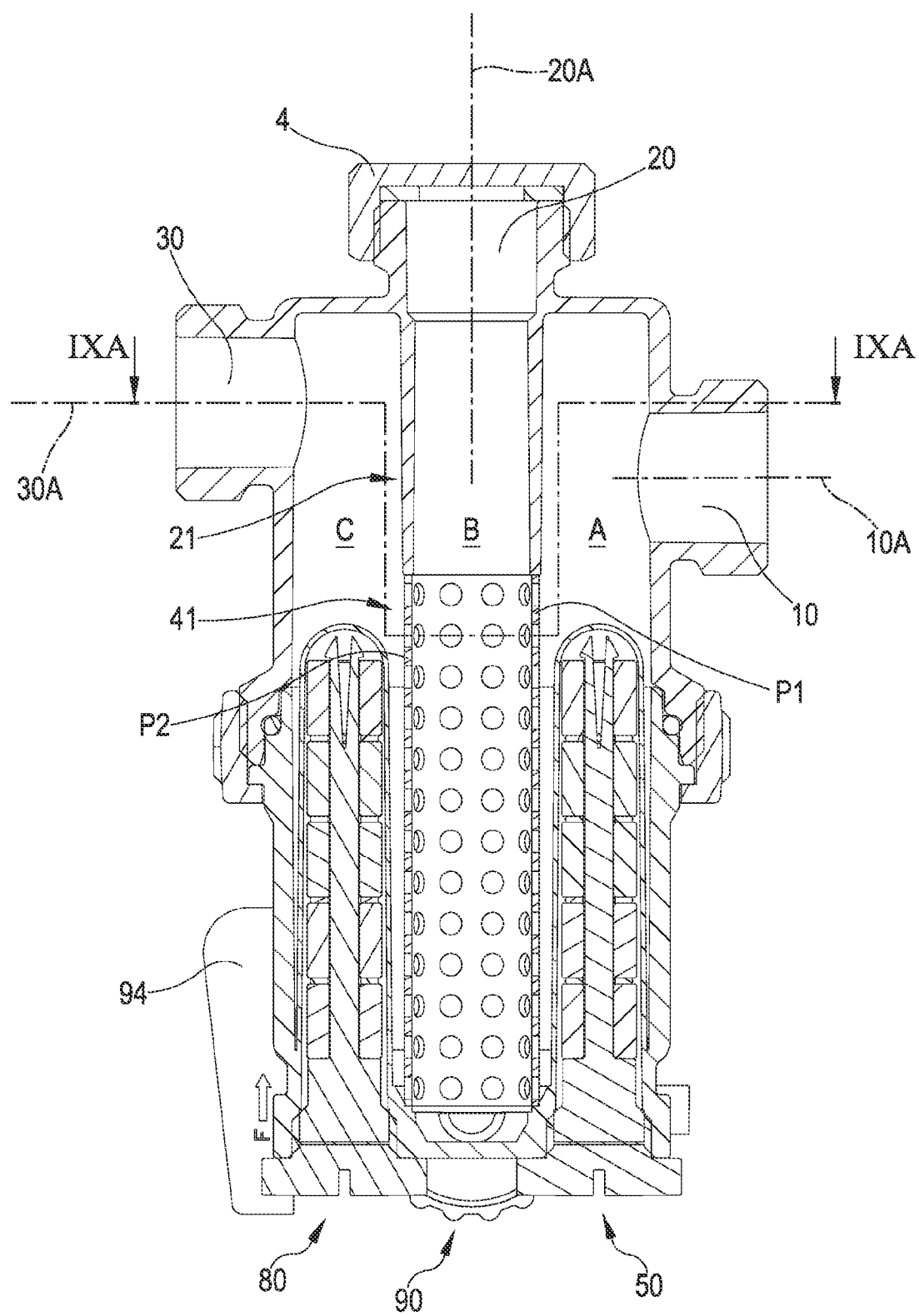
FIG. 9 shows the device of FIG. 7, sectioned along the plane VIIIA-VIIIA, in assembled condition.
Figure 9A:
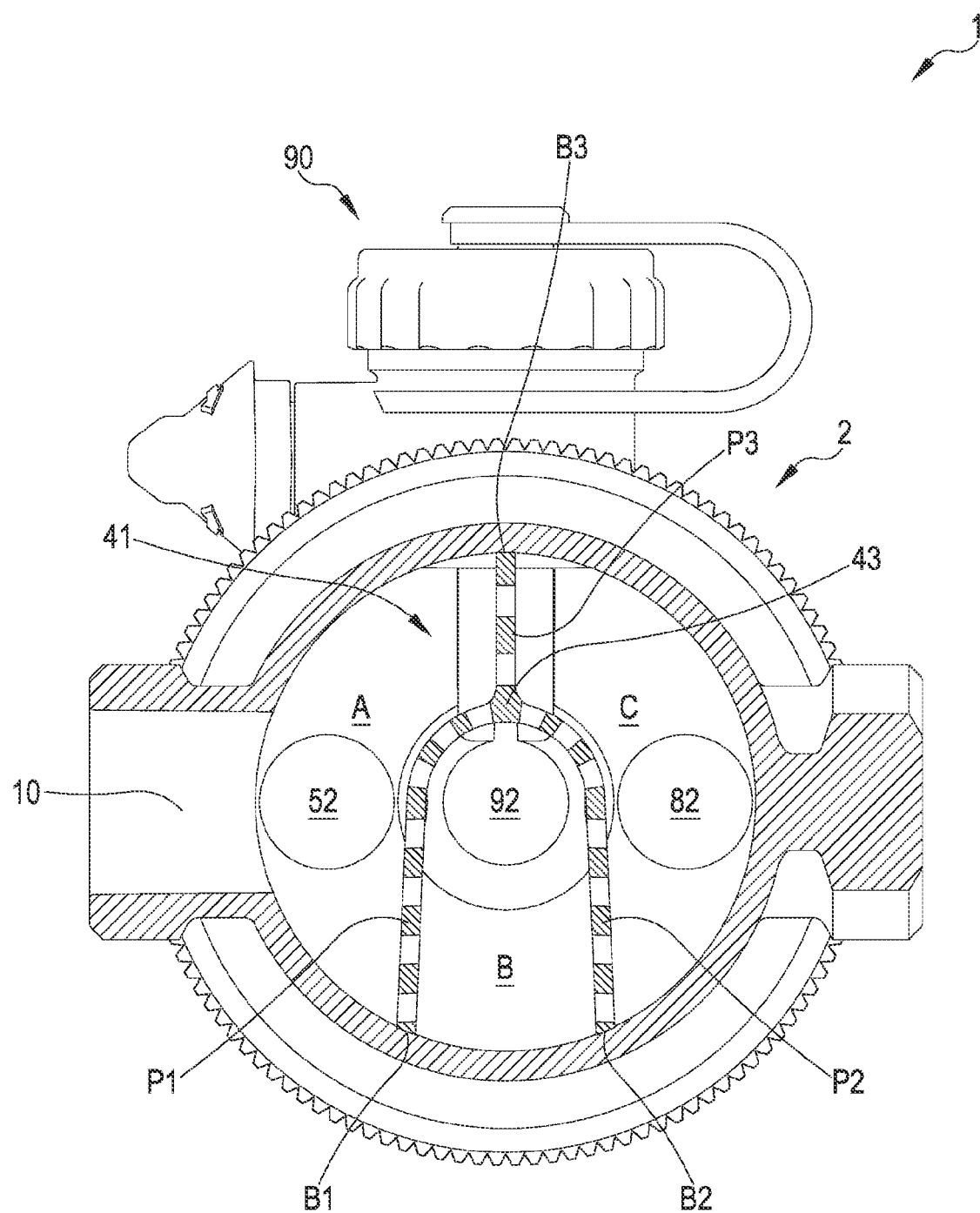
FIG. 9A shows the device of FIG. 7, sectioned along the transverse plane IXA-IXA, in assembled condition.
Figure 10:
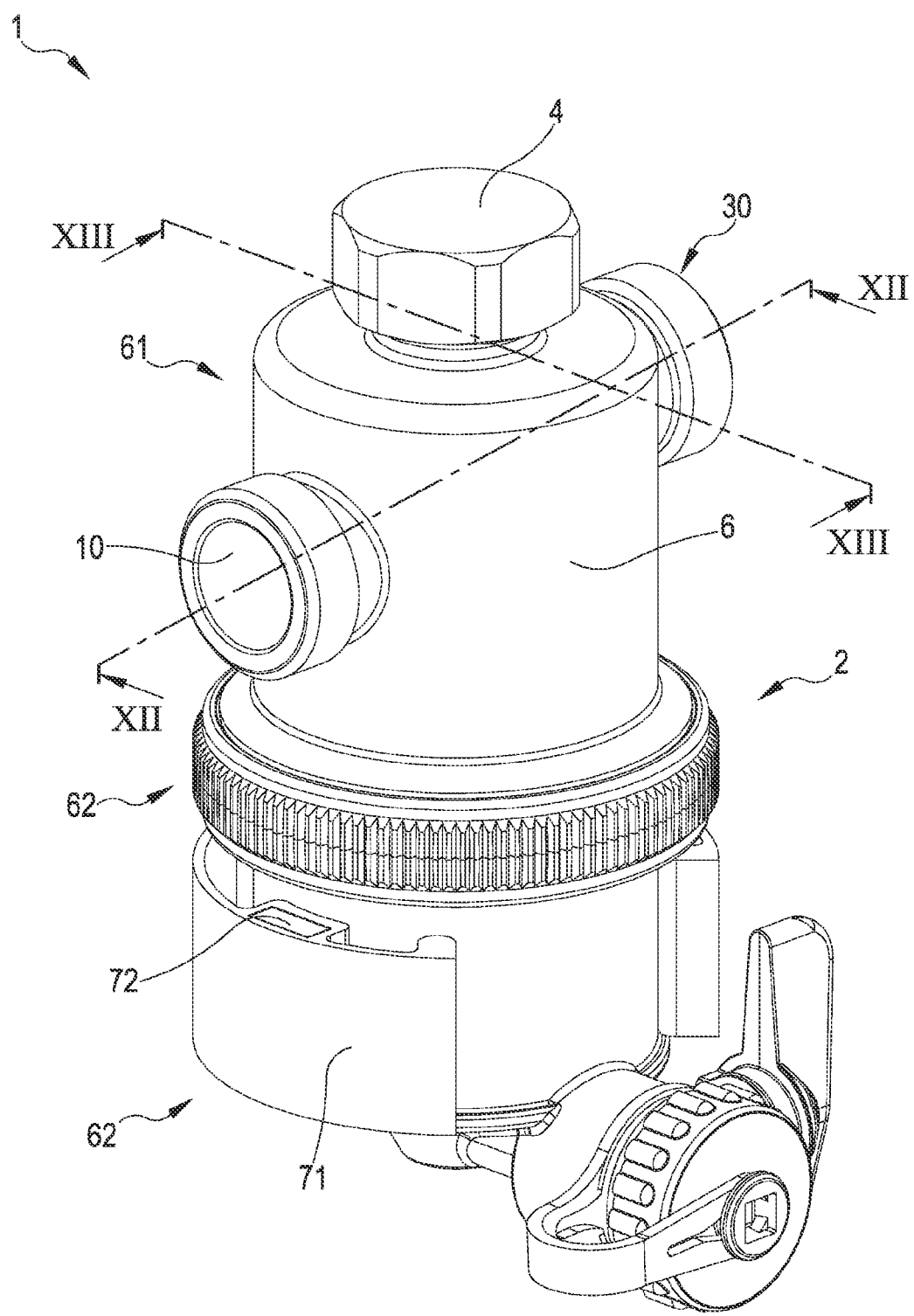
FIG. 10 is a perspective view that illustrates a further possible embodiment of a device for filtering a fluid according to the present invention.
Figure 11:
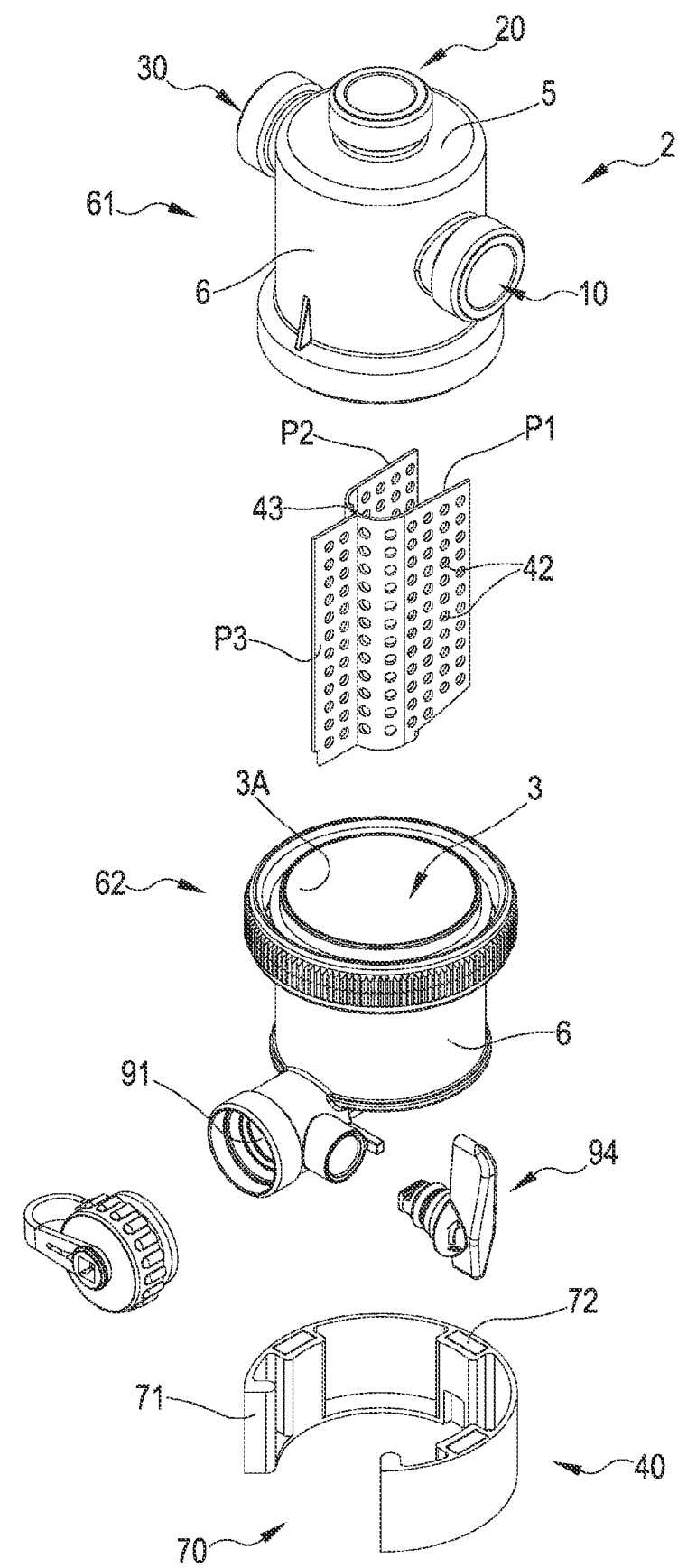
FIG. 11 shows an exploded prospective view of the device of FIG. 10.
Figure 12:
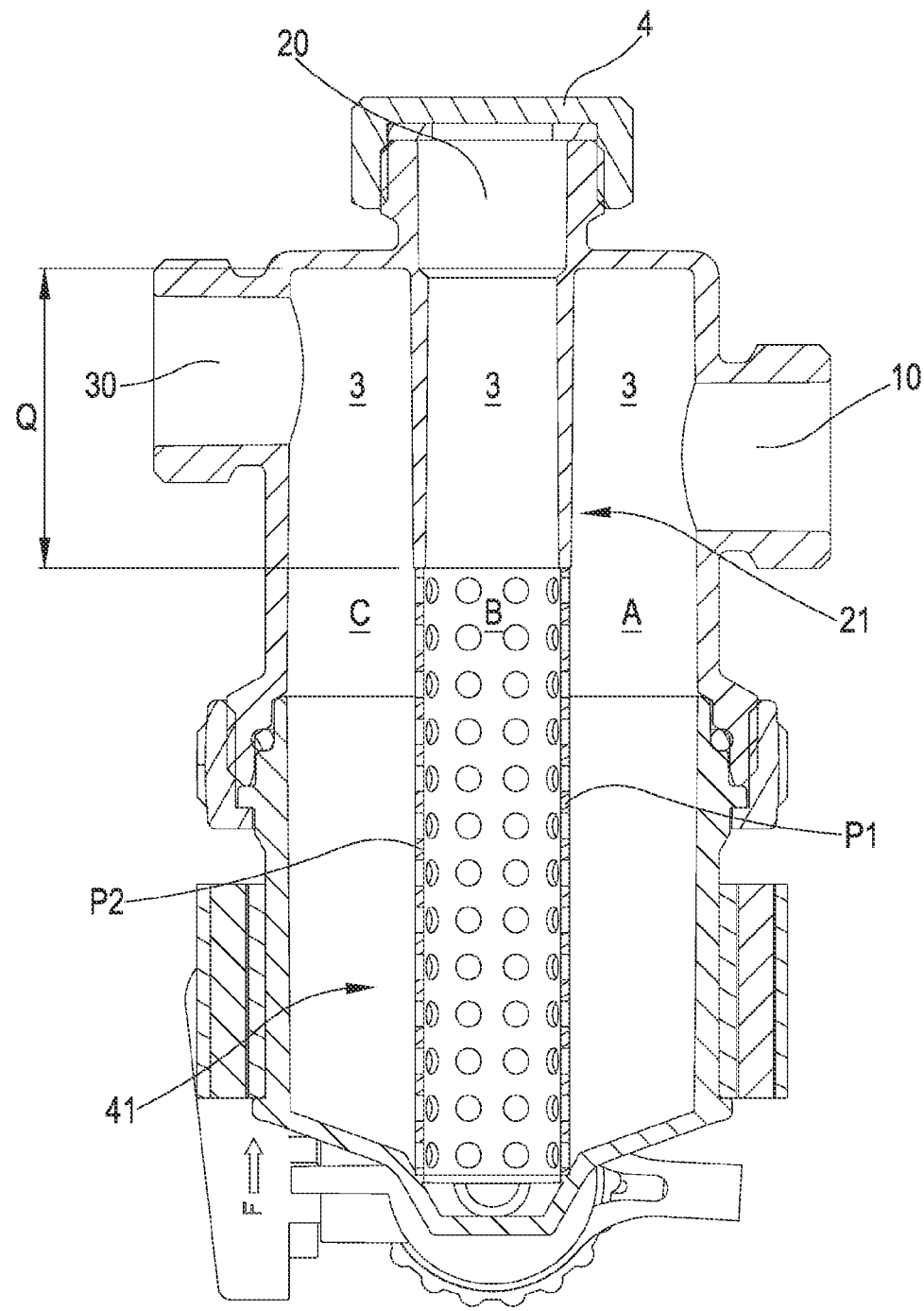
FIG. 12 shows the device of FIG. 10, sectioned along the plane XII-XII, in assembled condition.
Figure 13:
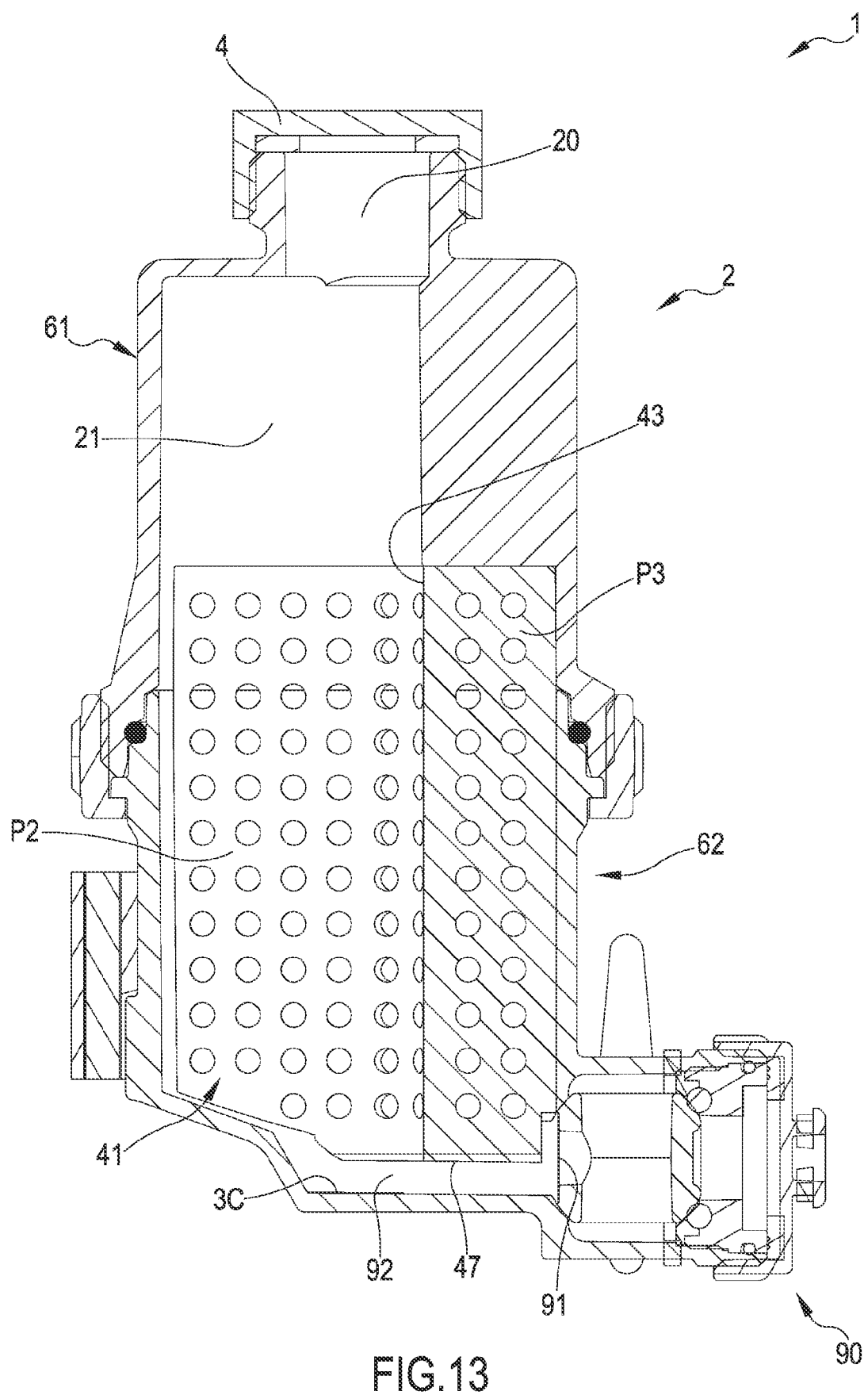
FIG. 13 shows the device of FIG. 10, sectioned along a central longitudinal plane XIII-XIII, which is orthogonal to the section plane of FIG. 12.

Preferably, the dividing structure 21 extends, starting from the top surface, inside the filtration chamber 3 according to a direction substantially consistent with the axis of longitudinal extension 2A of the body of the device and substantially to at least a level Q coinciding with the dimensions of the first inlet/outlet opening 10 on the outer lateral surface 6 of the body 2 of the device and/or with the dimensions of the third inlet/outlet opening 30 on the outer lateral surface 6 of the body 2 of the device (see for example FIG. 9). According to this embodiment, the mechanical filter 41 is positioned longitudinally between the bottom surface 3C of the body 2 of the device and the dividing structure 21.

Preferably, the dividing structure 21 is solidly constrained to the top surface and/or is in a single piece with the body 2 of the device.

Preferably, the mechanical filter 41 is positioned in the filtration chamber 3 below the dividing structure 21 so as to be below the three inlet/outlet openings 10, 20 and 30 along the axis of longitudinal extension 2A of the body 2 of the device, in a direction away from the second inlet/outlet opening 20.

Preferably, the first inlet/outlet opening 10, the second inlet/outlet opening 20 and the third inlet/outlet opening 30 have the same shape and dimension, are more preferably those which are identical to one another.

Preferably, the closure element 4 can be selectively combined with any one of the three inlet/outlet openings 10, 20 and 30, to determine the closing thereof. Preferably, the first inlet/outlet opening 10, the second inlet/outlet opening 20 and the third inlet/outlet opening 30 have respective interconnection means configured to fluidly connect the opening with outer water pipes, connections or valves. Preferably, the interconnection means is also configured to receive the closure element 4. Preferably, these interconnection means comprises threads or pressure attachments or similar mechanisms. Preferably, the interconnection means of the first inlet/outlet opening 10, of the second inlet/outlet opening 20 and of the third inlet/outlet opening 30 are structurally identical to one another. For example, the three inlet/outlet openings 10, 20 and 30 have standard dimensions for the hydraulic sector, for example a diameter of ¼ inch, ½ inch, ¾ inch, 1 inch.

Preferably, the filtering members 40 comprise at least one first magnetic filter (50 or 70) associated with the body 2 of the device and configured to collect substances and ferrous particles (or in general provided with ferromagnetic properties) that are present in the fluid to be treated, so as to separate the particles from the fluid that passes through the device and retain the particles inside the filtration chamber 3.

Reference is now made in particular to FIGS. 7-9A, which show a possible embodiment of the first magnetic filter.

Preferably, the body 2 of the device comprises at least one first hollow protuberance 51 emerging axially from the bottom surface 3C to the top surface 3B, this first hollow protuberance 51 defining, outside the body of the device, a first housing 52 of elongated shape corresponding (negatively) to the first hollow protuberance 51 and accessible from the lower surface 7; the first housing 52 accommodates internally the first magnetic filter 50.

Preferably, the first hollow protuberance 51 emerges axially inside the first sub-chamber A. Alternatively, the first hollow protuberance can emerge axially inside said second B or third sub-chamber C.

Preferably, the magnetic filter 50 comprises at least one first magnetic element 53, configured to generate a permanent magnetic field, inserted into the first housing 52 of the body 2 so as to act on the fluid passing through the filtration chamber 3 and retain the substances and ferrous particles present in the fluid on the surface of the first hollow protuberance 51 inside the body 2 (in particular inside the chamber 3). Substantially, the first magnetic filter 50 is positioned "inside" the filtration chamber 3, although it is physically inside the first housing 52 that is accessible from the outside of the body 2 without accessing the filtration chamber.

Preferably, the first hollow protuberance 51, emerging from the bottom surface 3C, is spaced laterally apart from the mechanical filter 41, and is contained completely inside the first sub-chamber A (or alternatively of the second sub-chamber B).

In this configuration, although the first magnetic filter 50 is not always completely in direct contact with the flow, or is not licked directly by all the fluid circulating in the filtration chamber in all the possible operating configurations, owing to the position and to the magnetic effect thereof it enables the ferrous particles to be blocked on the first hollow protuberance inside the body.

In an alternative embodiment that is not shown, the magnetic filter can be housed directly inside the filtration chamber.

Preferably, the magnetic filter 50 comprises a plurality of first magnetic elements 53 associated with one another to form a first rod-shaped magnetic cartridge 54 inserted axially into the first housing 52 of the body of the device.

Preferably, the first magnetic cartridge 54 comprises a first cap 55 adapted to be removably associated with the access to the first housing 52, on the lower surface 7, so as to close said first magnetic cartridge 54 inside the first housing 52 and to permit if necessary the extraction thereof.

Preferably, the body 2 comprises a first semi-body 61 and a second semi-body 62 that are removably associated with one another, in which:

the assembling of the first semi-body 61 with the second semi-body 62 defines the filtration chamber 3, inside the body of the device, fluid-tight to the outside except for said first inlet/outlet opening 10, second inlet/outlet opening 20 and third inlet/outlet opening 30 (and possibly, if present, the drain opening 91 illustrated below);

the disassembling the first semi-body 61 from the second semi-body 62 enables the filtration chamber 3 to be accessed and the mechanical filter 41 to be positioned and cleaning or maintenance tasks to be performed.

Preferably:

the first semi-body 61 comprises the first inlet/outlet opening 10, the second inlet/outlet opening 20, the third inlet/outlet opening 30, the top surface 3B, the dividing structure 21 (if present);

the second semi-body 62 comprises the bottom surface 3C and the first hollow protuberance 51.

Preferably, the lateral surface 3A of the filtration chamber 3 is defined partially by the first semi-body 61 and partially by the second semi-body 62.

Preferably, the first semi-body and the second semi-body are interconnected by a threaded coupling, for example by a ring nut.

Preferably, the body 2 of the device comprises a washer 63 interposed between the first semi-body 61 and the second semi-body 62, to seal the filtration chamber 3 in assembled condition.

The six operative configurations introduced above are disclosed below with reference to FIGS. 14-19 and 14A-19A. These configurations correspond to different possible operating modes of the device of the present invention. As illustrated, the device 1 is configured to operate selectively in one of the operative configurations, depending on installation needs.

The first operative configuration is shown in FIGS. 14 and 14A; in this configuration:

the first inlet/outlet opening 10 is destined to be set in communication with a line coming from a plumbing and heating system, in particular a heating water return line from a system of heating elements (for example radiators or radiating bodies), to receive a flow of water to be subjected to filtering;

the second inlet/outlet opening 20 is destined to be set in communication with a line directed to a boiler of the plumbing and heating system, to send thereto the flow of water following filtration;

the third inlet/outlet opening 30 is intercepted by the closure element 4;

the flow of fluid entering the first opening 10 flows into the first sub-chamber A and is necessarily directed to pass through at least the first wall P1 of the mechanical filter 41 undergoing mechanical filtration, with retention of the separated material inside the first sub-chamber A, and flowing into the second sub-chamber B;

preferably, part of the flow of fluid can pass through the third wall P3, with retention of the separated material inside the first sub-chamber A, continue inside the third sub-chamber C and from the third sub-chamber C, passing through the second wall P2 (the third inlet/outlet opening 30 being intercepted), flow into the second sub-chamber B; the flow of fluid entering the first sub-chamber A terminates filtration entirely in the second sub-chamber B;

the fluid is conveyed towards the second inlet/outlet opening 20, the third inlet/outlet opening 30 being intercepted;

the fluid preferably undergoes magnetic filtration by the first magnetic filter (50 or 70, the latter being illustrated below) at one or more of the sub-chambers (for example at the first sub-chamber if the magnetic filter 50 is inserted into the first housing 52 defined in the sub-chamber).

The second operative configuration is shown in FIGS. 15 and 15A; in this configuration:

the first inlet/outlet opening 10 is destined to be set in communication with a line coming from a plumbing and heating system, in particular a heating water return line from a system of heating elements (for example radiators or radiating bodies), to receive a flow of water to be subjected to filtering;

the second inlet/outlet opening 20 is intercepted by the closure element 4;

the third opening 30 is destined to be set in communication with a line directed to a boiler of the plumbing and heating system, to send thereto the flow of water following filtration;

the flow of fluid entering the first opening 10 flows into the first sub-chamber A and is necessarily directed to pass through at least the third wall P3 of the mechanical filter 41 undergoing mechanical filtration, with retention of the separated material inside the first sub-chamber A, and flowing into the third sub-chamber C;

preferably, part of the flow of fluid can pass through the first wall P1, with retention of the separated material inside the first sub-chamber A, continue inside the second sub-chamber B and from the second sub-chamber B, passing through the second wall P2 (the second inlet/outlet opening 20 being intercepted), flow into the third sub-chamber C; the flow of fluid entering the first sub-chamber A terminates filtration entirely in the third sub-chamber C;

the fluid is conveyed towards the third inlet/outlet opening 30, the second inlet/outlet opening 20 being intercepted;

the fluid preferably undergoes magnetic filtration by the first magnetic filter (50 or 70) at one or more of the sub-chambers.

The third operative configuration is shown in FIGS. 16 and 16A; in this configuration:

the second inlet/outlet opening 20 is destined to be set in communication with a line coming from a plumbing and heating system, in particular a heating water return line from a system of heating elements (for example radiators or radiating bodies), to receive a flow of water to be subjected to filtering;

the third inlet/outlet opening 30 is intercepted by a closure element 4;

the first inlet/outlet opening 10 is destined to be set in communication with a line directed to a boiler of the plumbing and heating system, to send thereto the flow of water following filtration;

the flow of fluid entering the second opening 20 flows into the second sub-chamber B and is necessarily directed to pass through at least the first wall P1 of the mechanical filter 41 undergoing mechanical filtration, with retention of the separated material inside the second sub-chamber B, and flowing into the first sub-chamber A;

preferably, part of the flow of fluid can pass through the second wall P2, with retention of the separated material inside the second sub-chamber B, continue inside the third sub-chamber C and from the latter, passing through the third wall P3 (the third inlet/outlet opening 30 being intercepted), flow into the first sub-chamber B; the flow of fluid entering the second sub-chamber C terminates filtration entirely in the first sub-chamber B;

the fluid is conveyed towards the first inlet/outlet opening 10, the third inlet/outlet opening 30 being intercepted;

the fluid preferably undergoes magnetic filtration by the first magnetic filter (50 or 70) at one or more of the sub-chambers.

The fourth operative configuration is shown in FIGS. 17 and 17A; in this configuration:

the second inlet/outlet opening 20 is destined to be set in communication with a line coming from a plumbing and heating system, in particular a heating water return line from a system of heating elements (for example radiators or radiating bodies), to receive a flow of water to be subjected to filtering;

the first inlet/outlet opening 10 is intercepted by a closure element 4;

the third opening 30 is destined to be set in communication with a line directed to a boiler of the plumbing and heating system, to send thereto the flow of water following filtration;

the flow of fluid entering the second opening 20 flows into the second sub-chamber B and is necessarily directed to pass through at least the second wall P2 of the mechanical filter 41 undergoing mechanical filtration, with retention of the separated material inside the second sub-chamber B, and flowing into the third sub-chamber C;

preferably, part of the flow of fluid can pass through the first wall P1, with retention of the separated material inside the second sub-chamber C, continue inside the second sub-chamber A and from the latter, passing through the third wall P3 (the first inlet/outlet opening 10 being intercepted), flow into the third sub-chamber B; the flow of fluid entering the second sub-chamber C terminates filtration entirely in the third sub-chamber B;

the fluid is conveyed towards the third inlet/outlet opening 30, the first inlet/outlet opening 10 being intercepted;

the fluid preferably undergoes magnetic filtration by the first magnetic filter (50 or 70) at one or more of the sub-chambers.

The fifth operative configuration is shown in FIGS. 18 and 18A; in this configuration:

the third inlet/outlet opening 30 is destined to be set in communication with a line coming from a plumbing and heating system, in particular a heating water return line from a system of heating elements (for example radiators or radiating bodies), to receive a flow of water to be subjected to filtering;

the second inlet/outlet opening 20 is intercepted by the closure element 4;

the first inlet/outlet opening 10 is destined to be set in communication with a line directed to a boiler of the plumbing and heating system, to send thereto the flow of water following filtration;

the flow of fluid entering the third opening 30 flows into the third sub-chamber C and is necessarily directed to pass through at least the third wall P3 of the mechanical filter 41, undergoing mechanical filtration, with retention of the separated material inside the third sub-chamber C, and flowing into the first sub-chamber A;

preferably, part of the flow of fluid can pass through the second wall P2, with retention of the separated material inside the third sub-chamber C, continue inside the second sub-chamber B and from the latter, passing through the first wall P1 (the second inlet/outlet opening 20 being intercepted), flow into the first sub-chamber A; the flow of fluid entering the third sub-chamber C terminates filtration entirely in the first sub-chamber A;

the fluid is conveyed towards the first inlet/outlet opening 10, the second inlet/outlet opening 20 being intercepted;

the fluid preferably undergoes magnetic filtration by the first magnetic filter (50 or 70) at one or more of the sub-chambers.

The sixth operative configuration is shown in FIGS. 19 and 19A; in this configuration:

the third inlet/outlet opening 30 is destined to be set in communication with a line coming from a plumbing and heating system, in particular a heating water return line from a system of heating elements (for example radiators or radiating bodies), to receive a flow of water to be subjected to filtering;

the first inlet/outlet opening 10 is intercepted by the closure element 4;

the second inlet/outlet opening 20 is destined to be set in communication with a line directed to a boiler of the plumbing and heating system, to send thereto the flow of water following filtration;

the flow of fluid entering the third opening 30 flows into the third sub-chamber C and is necessarily directed to pass through at least the second wall of the mechanical filter 41 undergoing mechanical filtration, with retention of the separated material inside the third sub-chamber, and flowing into the second sub-chamber B;

preferably, part of the flow of fluid can pass through the third wall P3, with retention of the separated material inside the third sub-chamber C, continue inside the first sub-chamber A and from the latter, passing through the first wall P1 (the first inlet/outlet opening 10 being intercepted), flow into the second sub-chamber B; the flow of fluid entering the third sub-chamber C terminates filtration entirely in the second sub-chamber B;

the fluid is conveyed towards the second inlet/outlet opening 20, the first inlet/outlet opening 10 being intercepted;

the fluid preferably undergoes magnetic filtration by the first magnetic filter (50 or 70) at one or more of the sub-chambers.

Preferably:

in the first and in the second configuration, the separated material by the mechanical filter 41 is retained in the first sub-chamber A;

in the third and in the fourth configuration, the separated material by the mechanical filter 41 is retained in the second sub-chamber A;

in the fifth and in the sixth configuration, the separated material by the mechanical filter 41 is retained in the third sub-chamber A;

Substantially, the material separated by the mechanical filter, owing to the particular shape of the latter, remains in the sub-chamber in which the fluid enters the device, i.e. in the respective sub-chamber with which each inlet/outlet opening is associated (first sub-chamber A per the first inlet/outlet opening 10, second sub-chamber B for the second inlet/outlet opening 20, third sub-chamber C for the third inlet/outlet opening 30).

It should be noted that, in each configuration, a preferential flow is present between the fluid inlet sub-chamber and the fluid outlet sub-chamber that—given the particular shape of the sub-chambers and of the mechanical filter—are always adjacent to and separated from one of the walls. In addition, in each configuration a further flow can be present that flows along a longer path, passing through the sub-chamber combined with the closed inlet/outlet opening in this configuration and reach the fluid outlet sub-chamber from the latter; the further flow then passes through in sequence the other two walls of the filter (different from the wall that directly divides the inlet and outlet sub-chambers and is passed through by the preferential flow).

Preferably:

in the first operative configuration, in the second operative configuration, in the fifth operative configuration and in the sixth operative configuration the device is positioned vertically, i.e. with the axis of longitudinal extension 2A of the body 2 of the device oriented vertically;

in the third operative configuration and in the fourth operative configuration the device is positioned horizontally, i.e. with the axis of longitudinal extension 2A of the body 2 of the device oriented horizontally.

If the boiler is placed above the device, it is possible to connect an angular connection (at 90° outside the opening that acts as an outlet for rising towards the boiler.

In FIGS. 14-19 and 14A-19A, the arrows indicating the path of the fluid inside the device in the different configurations should be observed.

It should be observed that typically the opening that acts as an inlet for the fluid is horizontal because it is destined to be connected to the return line from the system that normally exits from a wall below the boiler. In all cases, in each configuration, the device can operate horizontally or vertically. In this case, it is possible to use suitable connections, of known type, to make the plumbing connections between the openings that act as an inlet and outlet of the devices and the pipes of the system to which they have to be connected.

According to the embodiment shown by way of example in FIGS. 7-9A, the body 2 of the device can comprise a second hollow protuberance 81 emerging axially, in the filtration chamber 3, from the bottom surface 3C to the top surface 3B, said second hollow protuberance 81 defining, outside the body 2 of the device, a second housing 82 of elongated shape corresponding to the second hollow protuberance and accessible from the lower surface 7.

Preferably, the second hollow protuberance 81 emerges axially inside one of the sub-chambers that are not affected by the first hollow protuberance 51.

Preferably, the second hollow protuberance 81 emerges axially inside the third sub-chamber C, whereas the first hollow protuberance 51 emerges axially inside the first sub-chamber A.

Preferably, the second hollow protuberance 81, emerging from the bottom surface, is spaced laterally apart from the mechanical filter 41, and is contained completely inside the third sub-chamber (or alternatively the second sub-chamber).

Preferably, the first magnetic filter 50 can be associated selectively with the first hollow protuberance 51 or with the second hollow protuberance 81 of the body 2 of the device, depending on the selected operative configuration.

This is executable by removing the first cap 55 of the first magnetic filter and moving it to the desired housing 52 or 82.

Preferably, when the first magnetic filter 50 is associated with the first hollow protuberance 51 it performs magnetic filtration of the fluid in transit in the first sub-chamber A, whilst when the first magnetic filter 50 is associated with the second hollow protuberance 81 it performs magnetic filtration of the fluid in transit in the third sub-chamber C. Substantially, the device can comprise two hollow protuberances and just one magnetic filter 50, to be inserted selectively into the first housing 52 or into the second housing 82. In both cases, as the operative configurations always provide a passage of the fluid into the sub-chambers (and always passing through of the mechanical filter 41), magnetic filtering is guaranteed by at least the magnetic filter 50, regardless of the housing into which it is inserted.

In one possible embodiment, the filtering members 40 can further comprise a second magnetic filter 80 associated with the body 2 of the device and configured to catch and retain substances and particles provided with ferromagnetic properties that are present in the fluid to be treated, so as to separate the particles from the fluid that passes through the device. Preferably, the second magnetic filter 80 is structurally identical to the first magnetic filter 50.

Preferably, the second magnetic filter 80 comprises at least one second magnetic element 83, configured to generate a permanent magnetic field, inserted into the second housing of the body 2 so as to act on the fluid passing through the filtration chamber 3 and retain the ferromagnetic substances and particles present in the fluid on the surface of the second hollow protuberance 81 inside the body of the device.

Preferably, the second magnetic element 83 is structurally identical to the first magnetic element 53.

Preferably, the second magnetic filter 80 comprises a plurality of second magnetic elements 83 associated with one another to form a second rod-shaped magnetic cartridge 84 inserted axially into the second housing 82 of the body of the device.

Preferably, the second magnetic cartridge 84 comprises a second cap 85 adapted to be removably associated with the access to the second housing 82, on the lower surface 7, so as to close said second magnetic cartridge 84 inside the second housing 82 and to permit if necessary the extraction thereof.

Preferably, the second magnetic filter 80 is destined to be housed in the second housing 82 whereas the first magnetic filter 50 is destined to be housed in the first housing 52.

Reference is now made to FIGS. 1-6 and 10-13, which show a further possible embodiment of the first magnetic filter.

In this embodiment, the first magnetic filter 70 comprises a collar body 71 configured to be removably mounted to the outside of the body 2 of the device, and one or more magnetic elements 72, associated with the collar body 71 and configured to generate a permanent magnetic field, so as to act on the fluid passing through the filtration chamber 3 and retain the ferromagnetic substances and particles present in the fluid inside the filtration chamber itself.

Preferably, the collar body 71 has a ring shape and is dimensioned so as to envelop, at least partially, a portion of the outer lateral surface 6 of the body 2 of the device.

Preferably, the ring shape of the collar body has a partial interruption, along the circumferential extension of the ring, and the collar body 71 is removably mountable outside the body of the device by a snap-fit movement of the body itself given by the presence of said partial interruption.

Preferably, the collar body is made of a material, for example plastics, that enables the collar body to be deformed elastically during the snap-fit movement for the assembling to and disassembling from said body of the device.

Preferably, the collar body has one or more seats each configured to house, preferably removably, a respective magnetic element 72.

Preferably, the first magnetic filter comprises three magnetic elements that are housed in the collar body and are arranged circumferentially around the collar body, preferably angularly spaced at regular intervals.

Preferably, the first magnetic filter is configured to retain the substances and particles provided with ferromagnetic properties, present in the fluid that passes through the device, on the lateral surface 3A of the filtration chamber 3, particularly on the portion of lateral surface corresponding to the assembly position, outside the body of the device, of the collar body 71.

It should be noted that the "collar" magnetic filter 70 can also be used in combination with the magnetic filter 50 (or also in combination with the magnetic filter 80) of the "cartridge", type to increase the effect of magnetic filtration. In fact, the "collar" magnetic filter 70 is positioned externally around the body of the device, whereas the magnetic filters 50 or 80, of the "cartridge" type, are inserted into the housing 52 or 82 created by the protuberances 51 or 81 inside the filtration chamber.

Preferably, as illustrated in the figures, for each of the embodiments shown, the device can comprise a drain cock 90 configured to permit emptying of the filtration chamber, without disassembling of the device from the system in which it is installed, without disconnection of the first, second and third inlet/outlet opening from the respective lines, and without dismantling of the body of the device (in particular of the first semi-body 61 of the second semi-body 62).

Preferably, the drain cock 90 is positioned at a drain opening 91 placed on the bottom surface 3C of the body 2 of the device and selectively enables contents of the filtration chamber 3 to be emptied to permit cleaning or maintenance of the device.

Preferably, the drain opening 91 is located at the lower end of a drainage line 92 defined, on the bottom surface, straddling the lower end 47 of the mechanical filter 41, so that it is laterally in communication with the first sub-chamber A, with the second sub-chamber B and with the third sub-chamber C, but without setting them in communication with one another. See in particular FIG. 13.

Preferably, the drainage line 92 comprises an inclined portion of the bottom surface 3C, extending downwards, i.e. away from the top surface, this inclined portion enabling the filtered material inside the filtration chamber, in particular by the mechanical filter 41 to be conveyed to the drain opening by the force of gravity or decantation.

Preferably, the drain cock 90 can be operated selectively between a closed state, in which the drain opening 91 is intercepted and does not permit the fluid to exit the filtration chamber 3, and an open state, in which the drain opening 91 is set in communication with the outside of the device 1.

Preferably, the drain cock 90 comprises a shutter 93 that is active on the drain opening 91 so as to intercept the drain opening, in said closed state, or leave the passage free through the drain opening, in said open state.

Preferably, the drain cock 90 comprising a knob 94, or similar manual or automatic means for selecting the position of the shutter 93.

Preferably, the drain cock comprises a removable safety cap 95 positioned downstream of the shutter 93 and configured, when placed in position, to close the drain opening even if the knob turns the shutter to the open state.

It should be noted that, advantageously, the drain cock is configured, owing to positioning of the drain opening and the drainage line, to draw from all sub-chambers A, B and C, so as to permit effective drainage of the filtered material and cleaning of all three sub-chambers. This is particularly significant because, as illustrated above, depending on the operative configuration and the type of connection made for the first, the second and the third inlet opening, the material can be filtered from different sides of the different walls P1, P2 and P3 of the mechanical filter 41, and thus accumulate in the first sub-chamber A and/or in the second sub-chamber B and/or in the third sub-chamber C. The drain cock 90 permits in each case easy cleaning of the sub-chambers.

In another possible alternative embodiment, shown by way of example in the figures, the first 10 and the third inlet/outlet opening 30 are misaligned in relation to one another, i.e. the respective central axes 10A and 30A of the first opening 10 and of the third inlet/outlet opening 30 do not coincide with one another but are staggered. This means that the first 10 and the third inlet/outlet opening 30 are positioned, on the outer lateral surface 6 of the body 2, at different heights compared with the second opening 20, along the axis of longitudinal extension. This enables two different longitudinal distances or interaxes between the first opening 10 and second opening 20 and between the third opening 30 and the second opening 20 to be arranged. In this manner it is possible, advantageously, to select which opening to use as an inlet or outlet between the first opening 10 and the third opening 30, simply by rotating the entire body of the device by 180°.

This can be useful on the basis of the position of the return piping from the system (to which the inlet of the device will be connected) and of the boiler re-entry piping (to which the outlet of the device will be connected), in particular when operating in the fourth configuration. In this case, for example, on the basis of the delivery piping delivering to the boiler from the installation wall, it can be useful to select either the first or the third inlet opening as an outlet of the fluid from the device.

In general, regardless of the selected operative configuration, the device 1 is usually supported directly by the two lines of the system on which it is mounted (i.e. to which the openings are mounted that act as inlets and outlets).

For the sake of completeness, it should be considered that—in one limit embodiment comprised in the present invention—it is possible to provide an elongation of the first and of the second wall and a corresponding reduction of the length of the third wall P3, i.e. an approach of the junction line 43 to the end edge B3 on the lateral surface 3A of the filtration chamber, until the end edge B3 and the junction line 43 coincide in a single segment (on the lateral surface 3A) that also represents the third wall. In this case, in substance, the first and the second wall extend from the respective end edges B1 and B2, as far as a single junction line placed on the lateral surface 3A.

In this configuration of the mechanical filter, in which the Y shape has one of the three branches of the Y reduced to one line, the section becomes V-shaped, with each of the three vertices in contact with a respective point of the lateral surface 3A of the filtration chamber. In this case, in accordance with the present invention, there are still the three sub-chambers A, B and C, destined to house—respectively—the first, the second and the third inlet/outlet opening, but to pass from the first sub-chamber A to the third sub-chamber C, and vice versa, it is necessary to pass through the second sub-chamber B.

In possible equivalent embodiments, it is possible to increase the number of inlet/outlet openings, and correspondingly increase the number of chambers defined by the walls that make up the mechanical filter. For example, in the case of four inlet/outlet openings, four sub-chambers are defined, for example, by four walls arranged in a cross layout. Similarly, it is possible to provide n inlet/outlet openings and n filtration sub-chambers.

The method for filtering a fluid circulating in a plumbing and heating system according to the present invention corresponds preferably to the operating mode of the device 1. Substantially, this method:
prepares a device 1 preferably according to what has been disclosed;
identifies a line coming from the plumbing and heating system, in particular a heating water return line from a system of heating elements, carrying a flow of water to be subjected to filtering;
identifies a line directed to the boiler of the plumbing and heating system, carrying thereto a flow of water subjected to filtration;
operates the device selectively in one of the aforesaid operative configurations.

The invention as conceived herein is susceptible of numerous modifications and variants, all falling within the scope of the inventive concept and the cited components are replaceable by technically equivalent elements.

The invention achieves important advantages. First of all, as emerges clearly from the description set out above, the invention enables at least some of the prior art drawbacks to be overcome.

The device of the present invention enables effective filtration of a fluid circulating in a plumbing and heating system to be achieved, and to be achieved in every operative configuration. In particular, regardless of which opening acts as an inlet and which acts as an outlet, fluid filtration is always optimal. In fact, as amply set out above and illustrated in the figures, in each operative configuration the entire flow of fluid is subjected effectively to both mechanical and magnetic filtration, without any portion of fluid passing through the device without being fully filtered, as occurs on the other hand in solutions of known type. Thus the device of the present invention combines versatility of use, having three inlet/outlet openings and being able to decide which acts as an inlet for the fluid and which acts as an outlet, with maximum efficiency in terms of filtration for each operative configuration.

This enables the device to adapt to a high number and types of different boilers or other components of a heating system, to be able to be installed even in very limited spaces and at the same time perform the required filtering operations. To sum up, the device of the present invention is able to operate with uniform high performance regardless of the mode of installation inside a plumbing and heating system This is made possible, in particular, owing to the shape and positioning of the magnetic filter, which enables the three sub-chambers to be defined and the fluid to be directed so that it always transits (i.e. in each operative configuration) through the mechanical filter and at the magnetic filter (or the magnetic filters if more than one is present): this always makes filtering optimal, overcoming the problems of the prior art.

The path of the fluid in the filtration chamber, always from one sub-chamber to another, passing through at least one portion of the mechanical filter, enables effective filtration to be always obtained. The mechanical filter is in fact designed to manage all six different configurations: once the inlet opening and the outlet opening are selected (and the remaining opening is closed), the device is already reading for operating, without the need to modify the position of the elements of the device. In particular, the mechanical filter permits the operation of the device in the different configurations without any need for the mechanical filter to be moved or repositioned.

Further, the device of the present invention is characterized by great operating reliability, by less predisposition to faults and malfunctions and can be mounted, disassembled, cleaned and maintained simply and rapidly.

Lastly, the device of the present invention is characterized by a competitive cost and by a simple and rational structure.

The invention claimed is:

1. A device (1) for filtering a fluid circulating in a plumbing and heating system, said device (1) comprising a body (2) of the device which defines therewithin a filtration chamber (3) that is destined to have a fluid to be subjected to filtration pass through the filtration chamber (3), said body being provided with:
    a first inlet/outlet opening (10), which sets said filtration chamber (3) in communication with an outside of the device and is configured to be associated with a line so as to receive therefrom, or to send thereto, fluid entering or exiting said body of the device;
    a second inlet/outlet opening (20), which sets said filtration chamber (3) in communication with the outside of the device and is configured to be associated with a respective line so as to receive therefrom, or to send thereto, fluid entering or exiting said body of the device;
    a third inlet/outlet opening (30), which sets said filtration chamber (3) in communication with the outside of the device and is configured to be associated with a respective line so as to receive therefrom, or to send thereto, fluid entering or exiting said body of the device;
    the device being configured to operate a passage of fluid through said filtration chamber (3), in a selective manner according to a plurality of operative configurations, from one opening among said first inlet/outlet opening (10), said second inlet/outlet opening (20), and said third inlet/outlet opening (30) to another opening among said first inlet/outlet opening (10), said second inlet/outlet opening (20), and said third inlet/outlet opening (30),
    the device further comprising filtering members (40) that are at least partially housed inside said filtration chamber (3), or associated with said body (2) of the device, and operatively interposed between said first inlet/outlet opening, said second inlet/outlet opening and said third inlet/outlet opening to carry out filtering of the fluid passing through the filtration chamber;
    wherein said filtering members (40) comprise at least one mechanical filter (41) configured to perform a mechanical separation of substances and solid particles present in the fluid to be treated from the fluid in which the substances and solid particles are suspended, said mechanical filter (41) being arranged inside said filtration chamber (3) and structured so as to divide the filtration chamber into a first sub-chamber (A), a second sub-chamber (B) and a third sub-chamber (C), wherein:
    the first sub-chamber (A) is in fluid communication only with the first inlet/outlet opening, without passage through the mechanical filter;
    the second sub-chamber (B) is in fluid communication only with the second inlet/outlet opening, without passage through the mechanical filter;
    the third sub-chamber (C) is in fluid communication with only the third inlet/outlet opening, without passage through the mechanical filter;
    wherein in each of said plurality of operative configurations the fluid transiting in the filtration chamber (3) passes at least partially through said mechanical filter (41) in order to pass between said first sub-chamber (A), said second sub-chamber (B) and said third sub-chamber (C);
    wherein the mechanical filter (41) has a Y shape, in a cross section which is orthogonal to a longitudinal extension of the mechanical filter, said Y shape being configured to divide the filtration chamber into said first sub-chamber (A), second sub-chamber (B) and third sub-chamber (C), and wherein the mechanical filter (41) comprises:
    a first wall (P1) interposed between, and separating, the first inlet/outlet opening (10) and the second inlet/outlet opening;
    a second wall (P2) interposed between, and separating, the second inlet/outlet opening (20) and the third inlet/outlet opening (30); and
    a third wall (P3) interposed between, and separating, the first inlet/outlet opening (10) and the third inlet/outlet opening (30).

2. The device (1) according to claim 1, wherein the passage between the first sub-chamber (A) and the second sub-chamber (B), between the second sub-chamber (B) and the third sub-chamber (C) and between the first sub-chamber (A) and the third sub-chamber (C) necessarily takes place through at least a part or section of the mechanical filter (41), or wherein the first sub-chamber (A), the second sub-chamber (B) and the third sub-chamber (C) communicate with one another only through the mechanical filter (41), or wherein the mechanical filter (41) has, at least in one portion thereof, a structure provided with a plurality of holes (42) having a given filtering section, so that the passage of the fluid through the mechanical filter determines a retention, on one side of the mechanical filter, from which the fluid passing through the mechanical filter is coming, of the substances and particles present in the fluid and having larger dimensions than said filtering section.

3. The device (1) according to claim 1, wherein said first wall (P1), said second wall (P2) and said third wall (P3) together constitute the entire mechanical filter (41), and wherein said first wall (P1), said second wall (P2) and said third wall (P3) are joined to one another so as to form said mechanical filter (41) in a single piece, and/or wherein said first wall (P1), said second wall (P2) and said third wall (P3) extend vertically inside the filtration chamber (3).

4. The device (1) according to claim 1, wherein the mechanical filter (41) is configured to operate in a single position for use which is maintained for each of said plurality of operative configurations taken on by the device, in which:
    the mechanical filter (41) prevents the direct passage of the fluid from the first opening (10) to the second opening (20) or from the first opening (10) to the third opening (30), without passage through at least a portion of the mechanical filter itself;
    the mechanical filter (41) prevents direct passage of the fluid from the second opening (20) to the first opening (10) or from the second opening (20) to the third opening (30), without passage through at least a portion of the mechanical filter itself; and the mechanical filter (41) prevents direct passage of the fluid from the third opening (30) to the first opening (10) or from the third opening (30) to the second opening (20), without passage through at least a portion of the mechanical filter itself, and/or wherein the mechanical filter (41) is configured to operate in a single position for use, maintained for each of said plurality of operative configurations taken on by the device, in which:

a passage of the fluid from the first opening (10) to the second opening (20) or from the first opening (10) to the third opening (30) takes place by passage through at least a portion of the mechanical filter itself;

a passage of the fluid from the second opening (20) to the first opening (10) or from the second opening (20) to the third opening (30) takes place by passage through at least a portion of the mechanical filter itself; and a passage of the fluid from the third opening (30) to the first opening (10) or from the third opening (30) to the second opening (20) takes place by passage through at least a portion of the mechanical filter itself.

5. The device (1) according to claim 1, comprising a closure element (4) that is configured to selectively intercept one opening among said first inlet/outlet opening (10), said second inlet/outlet opening (20), and said third inlet/outlet opening (30), and wherein said plurality of operative configurations comprise at least:

a first operative configuration, in which said first opening (10) receives a flow of fluid entering the device, said second opening (20) sends the flow of filtered fluid exiting the device and said third opening (30) is intercepted by said closure element (4);

a second operative configuration, in which said first opening (10) receives a flow of fluid entering the device, said third opening (30) sends the flow of filtered fluid exiting the device and said second opening (20) is intercepted by said closure element (4);

a third operative configuration, in which said second opening (20) receives flow of fluid entering the device, said first opening (10) sends the flow of filtered fluid exiting the device and said third opening (30) is intercepted by said closure element (4);

a fourth operative configuration, in which said second opening (20) receives a flow of fluid entering the device, said third opening (30) sends the flow of filtered fluid exiting the device and said first opening (10) is intercepted by said closure element (4);

a fifth operative configuration, in which said third opening (30) receives a flow of fluid entering the device, said first opening (10) sends the flow of filtered fluid exiting the device and said second opening (20) is intercepted by said closure element (4); and a sixth operative configuration, in which said third opening (30) receives a flow of fluid entering the device, said second opening (20) sends the flow of filtered fluid exiting the device and said first opening (10) is intercepted by said closure element (4).

6. The device (1) according to claim 1, wherein the filtration chamber (3) is laterally delimited by a lateral surface (3A), above by a top surface (3B) and below by a bottom surface (3C) of the body (2) of the device, and wherein the mechanical filter is positioned longitudinally between the bottom surface (3C) and the top surface (3B) of the filtration chamber of the body (2) of the device, and wherein the filtration chamber (3) has a prevalent longitudinal extension from said bottom surface (3C) to said top surface (3B), and the mechanical filter (41) divides the filtration chamber into said first sub-chamber (A), said second sub-chamber (B) and said third sub-chamber (C), so that each sub-chamber also extends longitudinally from a respective portion of the bottom surface to a respective portion of the top surface, and wherein the first sub-chamber (A), the second sub-chamber (B) and the third sub-chamber (C) are laterally adjacent and contiguous to one another, or radially contiguous, or wherein the mechanical filter (41) has a prevalent dimension, which constitutes a height of the mechanical filter, along a direction coinciding with an axis of longitudinal extension (2A) of the body (2), wherein said height of the mechanical filter corresponds to a distance between the top surface (3B) and the bottom surface (3C) of the filtration chamber (3).

7. The device (1) according to claim 6, wherein said Y shape of the mechanical filter (41), on a plane orthogonal to the axis of longitudinal extension (2A) of the body (2), has an overall dimension corresponding to a radial dimension of the filtration chamber (3), so that the mechanical filter is in contact with the lateral surface (3A) of the filtration chamber (3), and wherein each of said first wall (P1), second wall (P2) and third wall (P3) of the mechanical filter terminates laterally in contact with the lateral surface (3A) of the filtration chamber (3).

8. The device (1) according to claim 6, wherein the body (2) of the device is provided with a dividing structure (21) extending inside the filtration chamber (3) from the top surface to an upper end (46) of the mechanical filter, and wherein the dividing structure (21) extends longitudinally with continuity relative to the mechanical filter (41) and, together with the mechanical filter (41), contributes to longitudinally dividing the filtration chamber into said first sub-chamber, said second sub-chamber and said third sub-chamber, and wherein the dividing structure (21) has the same shape, in a cross section orthogonal to the axis of longitudinal extension (2A), as the mechanical filter (41), and wherein the dividing structure (21) extends from the top surface inside the filtration chamber (3) according to a direction consistent with the axis of longitudinal extension (2A) of the body of the device and to at least a level (Q) coinciding with a size of the first inlet/outlet opening (10) on an outer lateral surface (6) of the body (2) of the device or with the dimensions of the third inlet/outlet opening (30) on the outer lateral surface (6) of the body (2) of the device.

9. The device (1) according to claim 6, wherein the filtering members (40) comprise at least a first magnetic filter (50; 70) associated with the body (2) of the device and configured to collect substances and particles having ferromagnetic properties and that are present in the fluid to be treated, in such a manner as to separate the substances and particles having ferromagnetic properties from the fluid passing through the device and retain the substances and particles having ferromagnetic properties inside the filtration chamber.

10. The device (1) according to claim 9, wherein the body (2) of the device comprises at least a first hollow protuberance (51) that emerges axially, in the filtration chamber, from said bottom surface (3C) towards said top surface (3B), said first hollow protuberance (51) defining, outside the body (2) of the device, a first housing (52) that is elongated in shape, corresponding to the first hollow protuberance (51) and accessible from a lower surface (7), said first housing (52) accommodating the first magnetic filter (50), and/or wherein said first hollow protuberance (51) emerges axially inside said first sub-chamber (A) or, alternatively, inside said third sub-chamber (C), and/or wherein the first magnetic filter (50) comprises at least a first magnetic element (53) that is configured to generate a permanent magnetic field and is inserted in said first housing (52) of the body (2) in such a manner as to act upon the fluid passing through the filtration chamber (3) and retain the ferromagnetic substances and particles present in the fluid on the surface of said first hollow protuberance (51) inside the body of the device.

11. The device (1) according to claim 9, said device (1) being configured to operate selectively, when in use, in one of the following operative configurations:
   a first operative configuration, in which:
      the first inlet/outlet opening (10) is destined to be set into communication with a line coming from a plumbing and heating system, so as to receive a flow of water to be subjected to filtration;
      the second inlet/outlet opening (20) is destined to be set into communication with a line directed to a boiler of the plumbing and heating system, so as to send thereto the flow of water following filtration;
      the third inlet/outlet opening (30) is intercepted by a closure element (4);
      the flow of fluid entering the first opening (10) flows into the first sub-chamber (A) and is necessarily directed so as to pass through at least the first wall (P1) of the mechanical filter (41), thus undergoing mechanical filtration, with retention of a separated material inside the first sub-chamber (A), and flowing into the second sub-chamber (B); a part of the flow of fluid passes through the third wall (P3), with retention of the separated material inside the first sub-chamber, continues inside the third sub-chamber (C) and from the third sub-chamber (C), passing through the second wall (P2), flows into the second sub-chamber (B), the flow of fluid entering the first sub-chamber (A) terminating the filtration entirely in said second sub-chamber (B);
      the fluid is conveyed towards the second inlet/outlet opening (20), the third inlet/outlet opening (30) being intercepted; and
      the fluid undergoes a magnetic filtration by the first magnetic filter (50) at one or more of said sub-chambers;
   a second operative configuration, in which:
      the first inlet/outlet opening (10) is destined to be set into communication with a line coming from a plumbing and heating system, so as to receive a flow of water to be subjected to filtration;
      the second inlet/outlet opening (20) is intercepted by a closure element (4);
      the third inlet/outlet opening (30) is destined to be set into communication with a line directed to a boiler of the plumbing and heating system, so as to send thereto the flow of water following filtration;
      the flow of fluid entering the first opening (10) flows into the first sub-chamber (A) and is necessarily directed so as to pass through at least the third wall (P3) of the mechanical filter (41), thus undergoing mechanical filtration, with retention of a separated material inside the first sub-chamber (A), and flowing into the third sub-chamber (C); a part of the flow of fluid passes through the first wall (P1), with retention of the separated material inside the first sub-chamber (A), continues inside the second sub-chamber (B) and from the second sub-chamber (B), passing through the second wall (P2), flows into the third sub-chamber (C), the flow of fluid entering the first sub-chamber (A) terminating the filtration entirely in said third sub-chamber (C);
      the fluid is conveyed towards the third inlet/outlet opening (30), the second inlet/outlet opening (20) being intercepted;
   a third operative configuration, in which:
      the second inlet/outlet opening (20) is destined to be set into communication with a line coming from a plumbing and heating system, so as to receive a flow of water to be subjected to filtration;
      the third inlet/outlet opening (30) is intercepted by a closure element (4);
      the first inlet/outlet opening (10) is destined to be set into communication with a line directed to a boiler of the plumbing and heating system, so as to send thereto the flow of water following filtration;
      the flow of fluid entering the second opening (20) flows into the second sub-chamber (B) and is necessarily directed so as to pass through at least the first wall (P1) of the mechanical filter (41), thus undergoing mechanical filtration, with retention of a separated material inside the second sub-chamber (B), and flowing into the first sub-chamber (A); a part of the flow of fluid passes through the second wall (P2), with retention of the separated material inside the second sub-chamber (B), continues inside the third sub-chamber (C) and from the third sub-chamber (C), passing through the third wall (P3), flows into the first sub-chamber (A), the flow of fluid entering the second sub-chamber (B) terminating the filtration entirely in said first sub-chamber (A);
      the fluid is conveyed toward the first inlet/outlet opening (10), the third inlet/outlet opening (30) being intercepted;
   a fourth operative configuration, in which:
      the second inlet/outlet opening (20) is destined to be set into communication with a line coming from a plumbing and heating system, so as to receive a flow of water to be subjected to filtration;
      the first inlet/outlet opening (10) is intercepted by a closure element (4);
      the third inlet/outlet opening (30) is destined to be set into communication with a line directed to a boiler of the plumbing and heating system, so as to send thereto the flow of water following filtration;
      the flow of fluid entering the second opening (20) flows into the second sub-chamber (B) and is necessarily directed so as to pass through at least the second wall (P2) of the mechanical filter (41), thus undergoing mechanical filtration, with retention of a separated material inside the second sub-chamber (B), and flowing into the third sub-chamber (C);
      a part of the flow of fluid passes through the first wall (P1), with retention of the separated material inside the second sub-chamber (B), continues inside the first sub-chamber (A) and from the first sub-chamber (A), passing through the third wall (P3), flows into the third sub-chamber (C), the flow of fluid entering the second sub-chamber (B) terminating the filtration entirely in said third sub-chamber (C);
      the fluid is conveyed toward the third inlet/outlet opening (30), the first inlet/outlet opening (10) being intercepted;
   a fifth operative configuration, in which:
      the third inlet/outlet opening (30) is destined to be set into communication with a line coming from a plumbing and heating system, so as to receive a flow of water to be subjected to filtration;

the second inlet/outlet opening (20) is intercepted by a closure element (4);

the first inlet/outlet opening (10) is destined to be set into communication with a line directed to a boiler of the plumbing and heating system, so as to send thereto the flow of water following filtration;

the flow of fluid entering the third opening (30) flows into the third sub-chamber (C) and is necessarily directed so as to pass through at least the third wall (P3) of the mechanical filter (41), thus undergoing mechanical filtration, with retention of a separated material inside the third sub-chamber (C), and flowing into the first sub-chamber (A); a part of the flow of fluid passes through the second wall (P2), with retention of the separated material inside the third sub-chamber (C), continues inside the second sub-chamber (B) and from the second sub-chamber (B), passing through the first wall (P1), flows into the first sub-chamber (A), the flow of fluid entering the third sub-chamber (C) terminating the filtration entirely in said first sub-chamber (A);

the fluid is conveyed toward the first inlet/outlet opening (10), the second inlet/outlet opening (20) being intercepted;

a sixth operative configuration, in which:

the third inlet/outlet opening (30) is destined to be set into communication with a line coming from a plumbing and heating system, so as to receive a flow of water to be subjected to filtration;

the first inlet/outlet opening (10) is intercepted by a closure element (4);

the second inlet/outlet opening (20) is destined to be set into communication with a line directed to a boiler of the plumbing and heating system, so as to send thereto the flow of water following filtration;

the flow of fluid entering the third opening (30) flows into the third sub-chamber (C) and is necessarily directed so as to pass through at least the second wall (P2) of the mechanical filter (41), thus undergoing mechanical filtration, with retention of a separated material inside the third sub-chamber (C), and flowing into the second sub-chamber (B);

a part of the flow of fluid passes through the third wall (P3), with retention of the separated material inside the third sub-chamber (C), continues inside the first sub-chamber (A) and from the first sub-chamber (A), passing through the first wall (P1), flows into the second sub-chamber (B), the flow of fluid entering the third sub-chamber (C) terminating the filtration entirely in said second sub-chamber (B);

the fluid is conveyed toward the second inlet/outlet opening (20), the first inlet/outlet opening (10) being intercepted.

12. The device (1) according to claim 6, comprising a drain cock (90) configured to enable the filtration chamber (3) to be emptied without disassembling the device from the system in which the device is installed, without disconnecting the first, second, and third inlet/outlet openings from respective lines, and without disassembling the body (2) of the device, wherein the drain cock (90) is positioned at a drain opening (91) located at a lower end of a drainage line (92) defined, on the bottom surface (3C) of the body (2), below a lower end (47) of the mechanical filter (41), in such a manner as to be in communication with a base of one or more, or all, of said first sub-chamber (A), said second sub-chamber (B) and/or said third sub-chamber (C), without putting said first sub-chamber (A), said second sub-chamber (B) and said third sub-chamber (C) in communication with one another, and/or wherein the drainage line (92) comprises an inclined portion of the bottom surface (3C), extending downwards, and away from the top surface (3B), said inclined portion enabling a separated material filtered inside the filtration chamber, and/or wherein the drain cock (90) to be conveyed towards the drain opening (91) by gravity or settling, and/or wherein the drain cock (90) is operated selectively in a closed state, in which the drain opening (91) is intercepted and does not allow the fluid to leave the filtration chamber (3), or an open state, in which the drain opening (91) is set in communication with the outside of the device.

13. The device (1) according to claim 1, wherein the mechanical filter (41) has the form of a layer or membrane, with a given shape, and extends longitudinally between an upper end (46) and a lower end (47), or wherein the mechanical filter (41) has a given cross section, orthogonal to a longitudinal extension thereof, which is constant.

14. The device (1) according to claim 1, wherein the first sub-chamber (A) is defined between the first wall (P1) and the third wall (P3), the second sub-chamber (B) is defined between the first wall (P1) and the second wall (P2) and the third sub-chamber (C) is defined between the second wall (P2) and the third wall (P3), and wherein each of said first wall (P1), said second wall (P2) and said third wall (P3) has, at least in a respective portion, a structure provided with a plurality of holes (42) having a given filtering section, and is configured to mechanically filter a flow of fluid with both sides thereof, according to a direction from which the fluid to be filtered is coming.

15. The device (1) according to claim 6, wherein said first wall (P1), said second wall (P2) and said third wall (P3) each have the form of a flat or curved layer, and/or wherein said first wall (P1), said second wall (P2) and said third wall (P3) are joined, in the mechanical filter, at a junction line (43) which is common to the first wall (P1), the second wall (P2) and the third wall (P3), and wherein the first sub-chamber (A), the second sub-chamber (B) and the third sub-chamber (C) of the filtration chamber (3) converge at said junction line (43) without entering into fluid communication except through the mechanical filter (3).

16. The device (1) according to claim 15, wherein said first wall (P1), said second wall (P2) and said third wall (P3) terminate, on an opposite side relative to said junction line (43), with respective end edges, in contact with the lateral surface (3A) of the filtration chamber (3), so that:

the end edge (B1) of the first wall (P1) is set in contact with a first line of the lateral surface (3A) interposed between the first inlet/outlet opening and the second inlet/outlet opening and separating the first sub-chamber (A) from the second sub-chamber (B);

the respective end edge (B2) of the second wall (P2) is set in contact with a second line of the lateral surface (3A) interposed between the second inlet/outlet opening and the third inlet/outlet opening and separating the second sub-chamber (B) from the third sub-chamber (C); and the respective end edge (B3) of the third wall (P3) is set in contact with a third line of the lateral surface (3A) interposed between the third inlet/outlet opening and the first inlet/outlet opening and separating the third sub-chamber (C) from the first sub-chamber (A).

17. The device (1) according to claim 8, wherein the mechanical filter is positioned longitudinally between the bottom surface (3C) of the body (2) of the device and the dividing structure (21), or wherein the dividing structure (21) is integral with the top surface or is in a single piece with the body of the device.

\* \* \* \* \*